(12) United States Patent
Sugiyama et al.

(10) Patent No.: US 6,289,137 B1
(45) Date of Patent: *Sep. 11, 2001

(54) IMAGE PROCESSING APPARATUS AND METHOD

(75) Inventors: Norio Sugiyama, Fujisawa; Sadasuke Kurahayashi, Niiza; Masahiro Sakamoto, Tokyo; Katsutoshi Ushida, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,758

(22) Filed: Dec. 15, 1997

Related U.S. Application Data

(63) Continuation of application No. 08/455,545, filed on May 31, 1995.

(30) Foreign Application Priority Data

Jun. 2, 1994 (JP) .................................................... 6-121246
Jun. 30, 1994 (JP) .................................................... 6-149424

(51) Int. Cl.$^7$ ............................... G06K 9/32; H04N 1/40
(52) U.S. Cl. ......................... 382/299; 382/298; 358/451
(58) Field of Search .................................... 358/400, 401, 358/406, 474, 434–439, 455, 465, 466, 448, 451; 379/100.01; 382/299, 298

(56) References Cited

U.S. PATENT DOCUMENTS

| | | | |
|---|---|---|---|
| 4,251,837 | 2/1981 | Janeway, III | 358/280 |
| 4,841,375 | 6/1989 | Nakajima et al. | 353/280 |
| 4,947,345 | 8/1990 | Paradise | 364/519 |
| 4,974,097 | * 11/1990 | Kaneko | 358/400 |
| 5,257,116 | 10/1993 | Suzuki | 358/465 |
| 5,341,221 | 8/1994 | Mikada | 358/400 |
| 5,387,983 | 2/1995 | Sugiura et al. | 358/434 |
| 5,521,990 | * 5/1996 | Ishizawa | 382/270 |
| 5,768,432 | * 6/1998 | Schweid | 382/237 |
| 5,933,539 | * 8/1999 | Metcalfe | 382/252 |
| 5,937,147 | * 8/1999 | Ng | 395/109 |

* cited by examiner

*Primary Examiner*—Jerome Grant, II
(74) *Attorney, Agent, or Firm*—Fitzpatrick, Cella, Harper & Scinto

(57) ABSTRACT

An image processing apparatus or a facsimile apparatus or the like is constructed by an input unit for inputting image data, a data conversion unit for converting density characteristics of image data inputted by the input unit, and an output unit such as ink jet printer, laser beam printer, or the like for outputting the image data at a predetermined resolution. The data conversion unit converts density characteristics so as to almost equalize densities even when a resolution of the image data that is outputted by the output unit differs. The data conversion unit converts the density characteristics of the input image data on the basis of a luminance/density conversion table formed every resolution of the image data that is outputted by the output unit. The resolution of the output image data is higher than the resolution of the input image data.

42 Claims, 16 Drawing Sheets

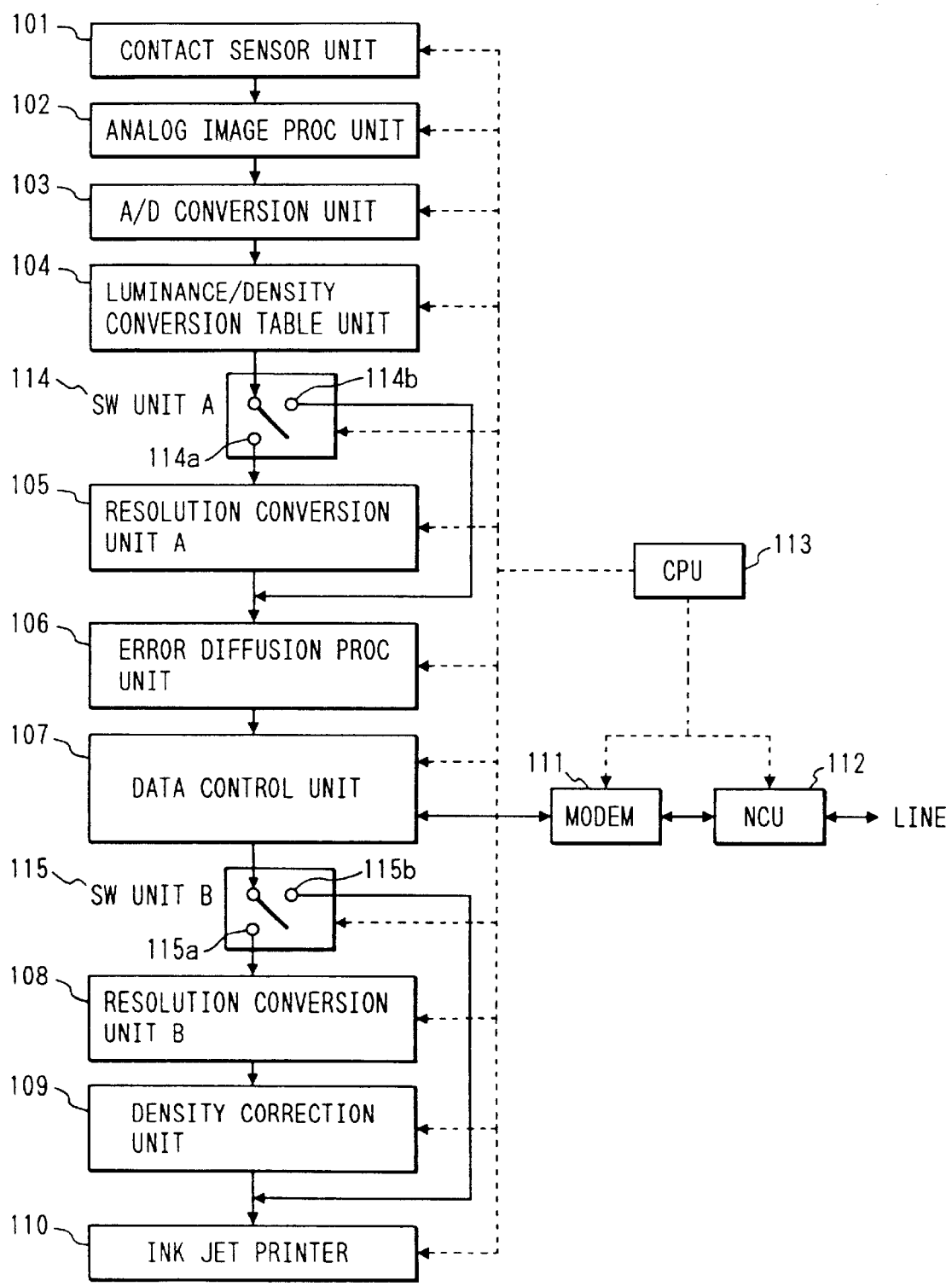

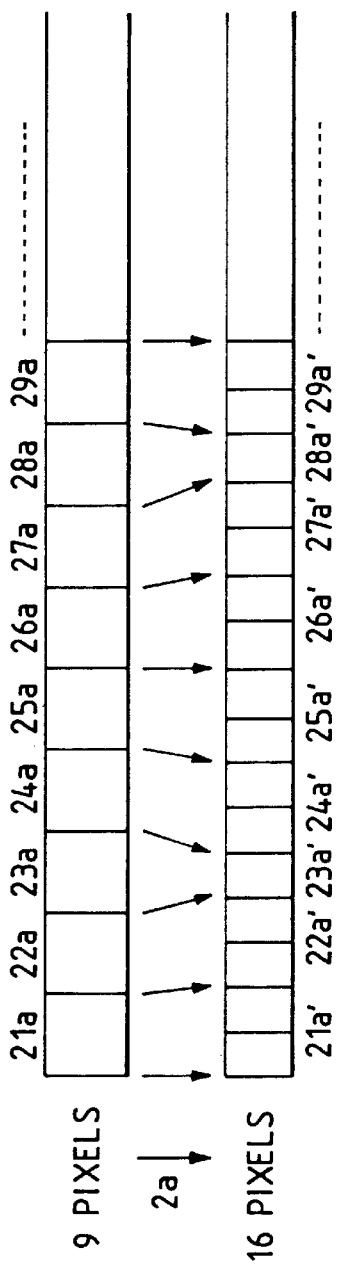
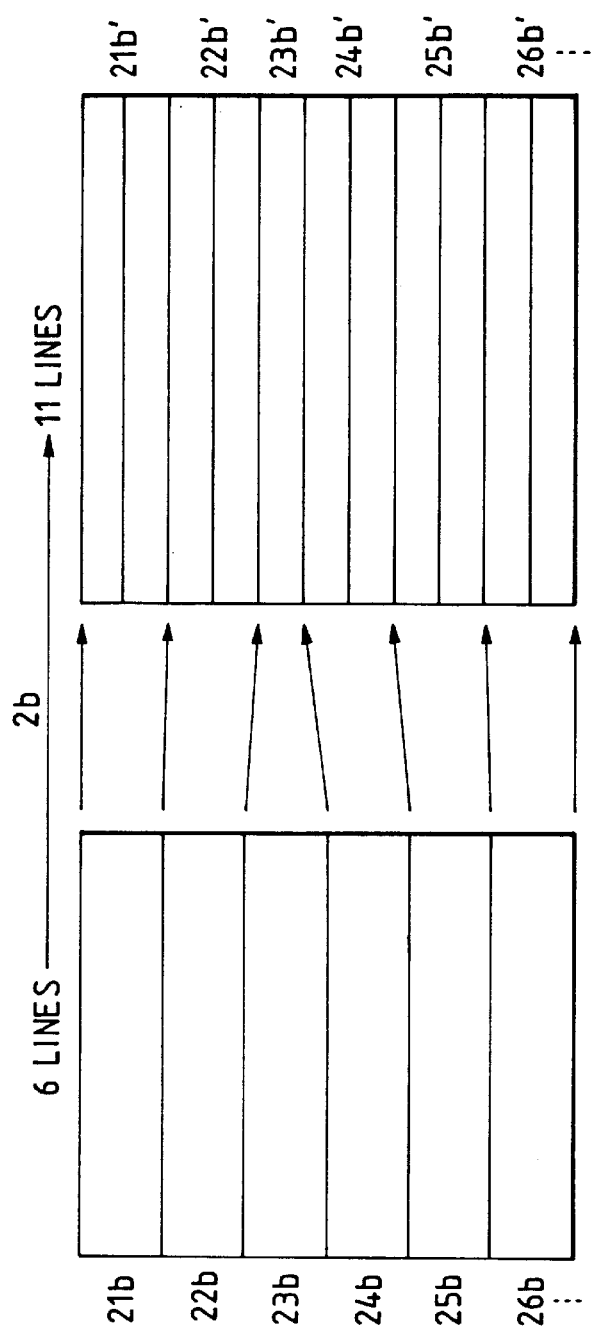
FIG. 2A
FIG. 2B

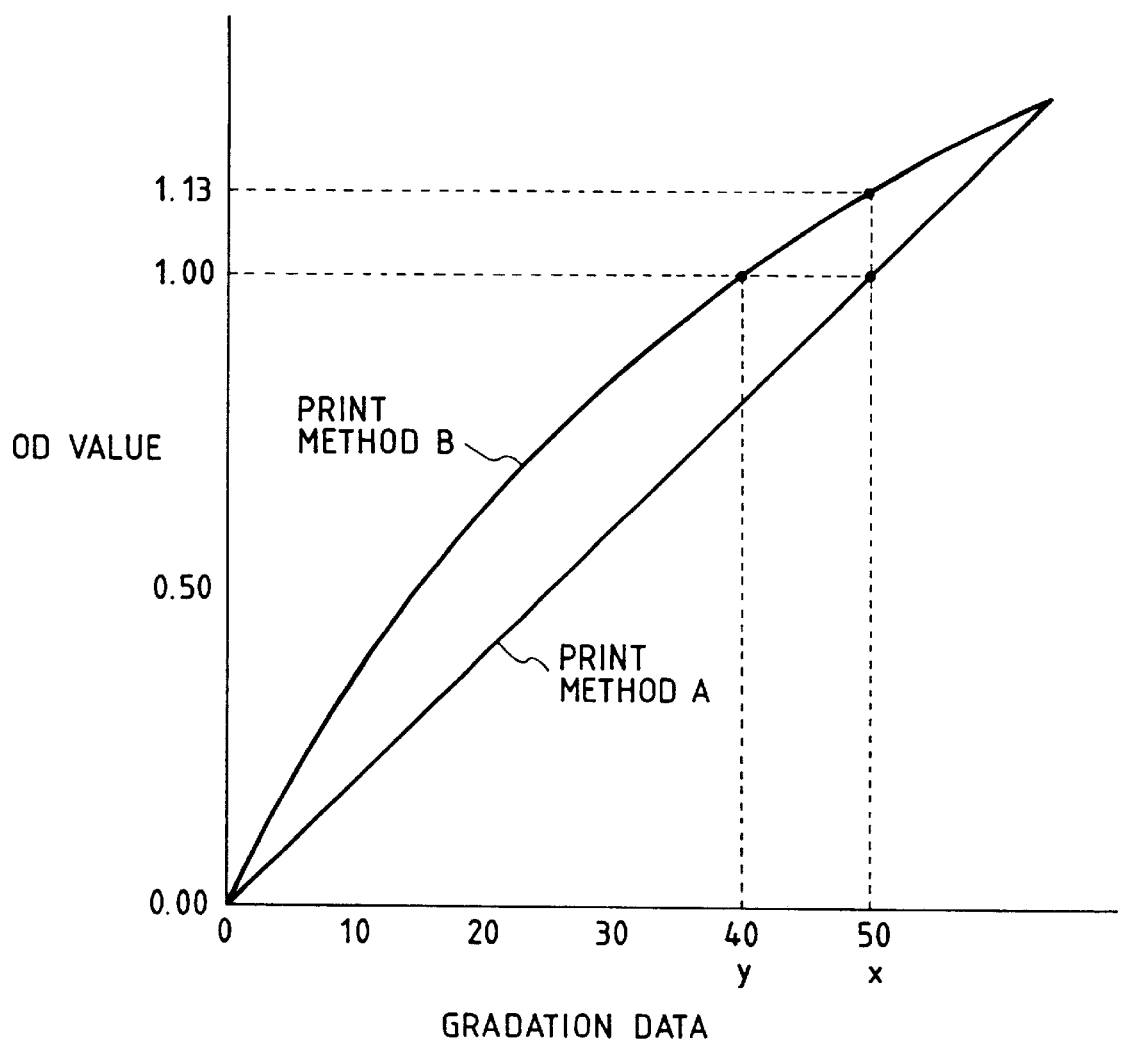

FIG. 9

|  | D0 | D0' | D1 | D1' | D2 | D2' | D3 | D3' | D4 | D4' |
|---|---|---|---|---|---|---|---|---|---|---|
| INPUT | 60 |  | 60 |  | 40 |  | 20 |  | 10 |  |
| ENLARGEMENT | 60 | 60 | 60 | 60 | 40 | 40 | 20 | 20 | 10 | 10 |
| EDGE | 60 | 60 | 60 | 64 | 20 | 60 | 0 | 30 | 0 | 10 |
| EDGE | 60 |  | 64 |  | 40 | 40 | 10 |  | 0 |  |
| ENLARGEMENT | 60 | 60 | 64 | 64 | 40 | 40 | 10 | 10 | 0 | 0 |

FIG. 10

| -1 | 2 | -1 |
|---|---|---|

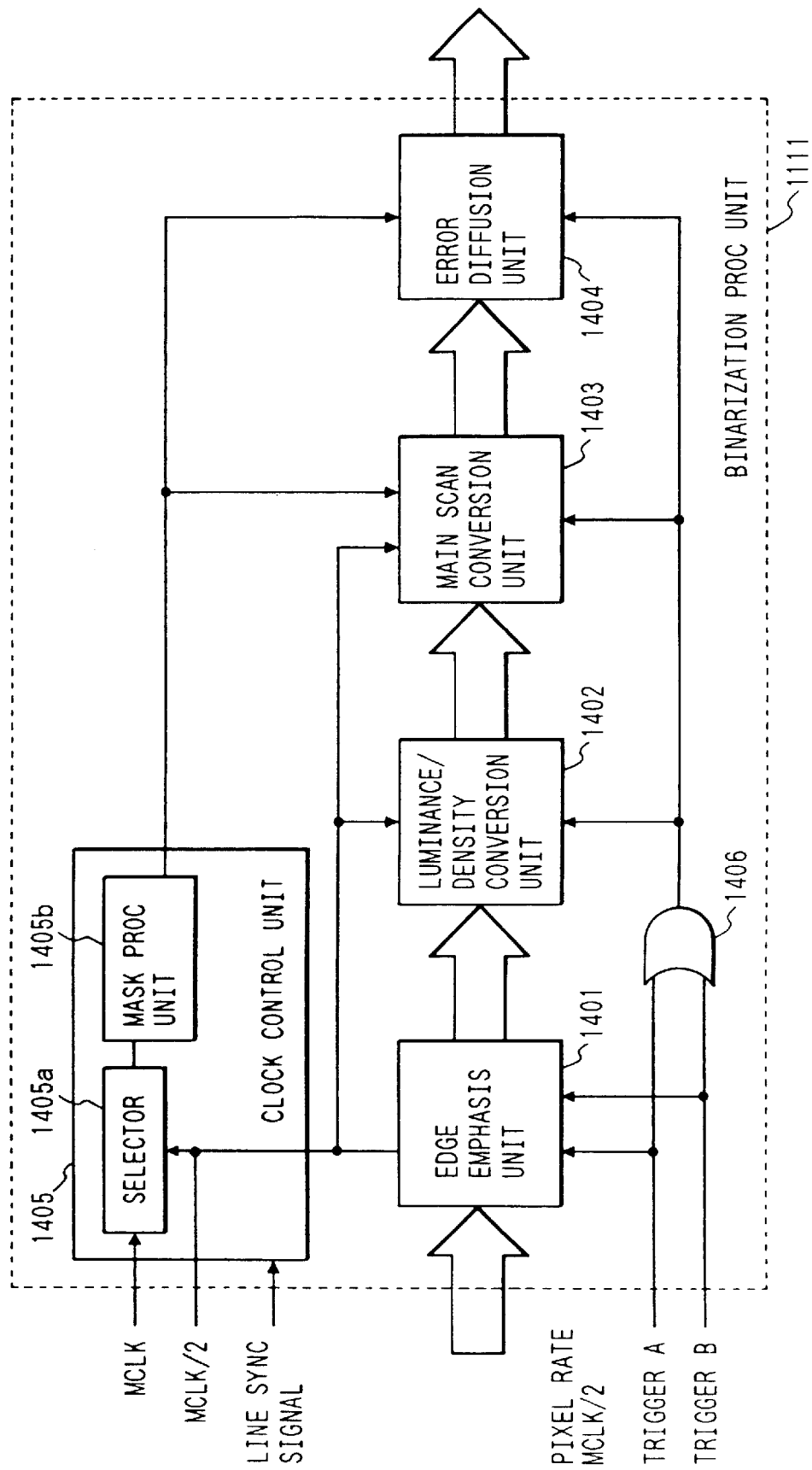

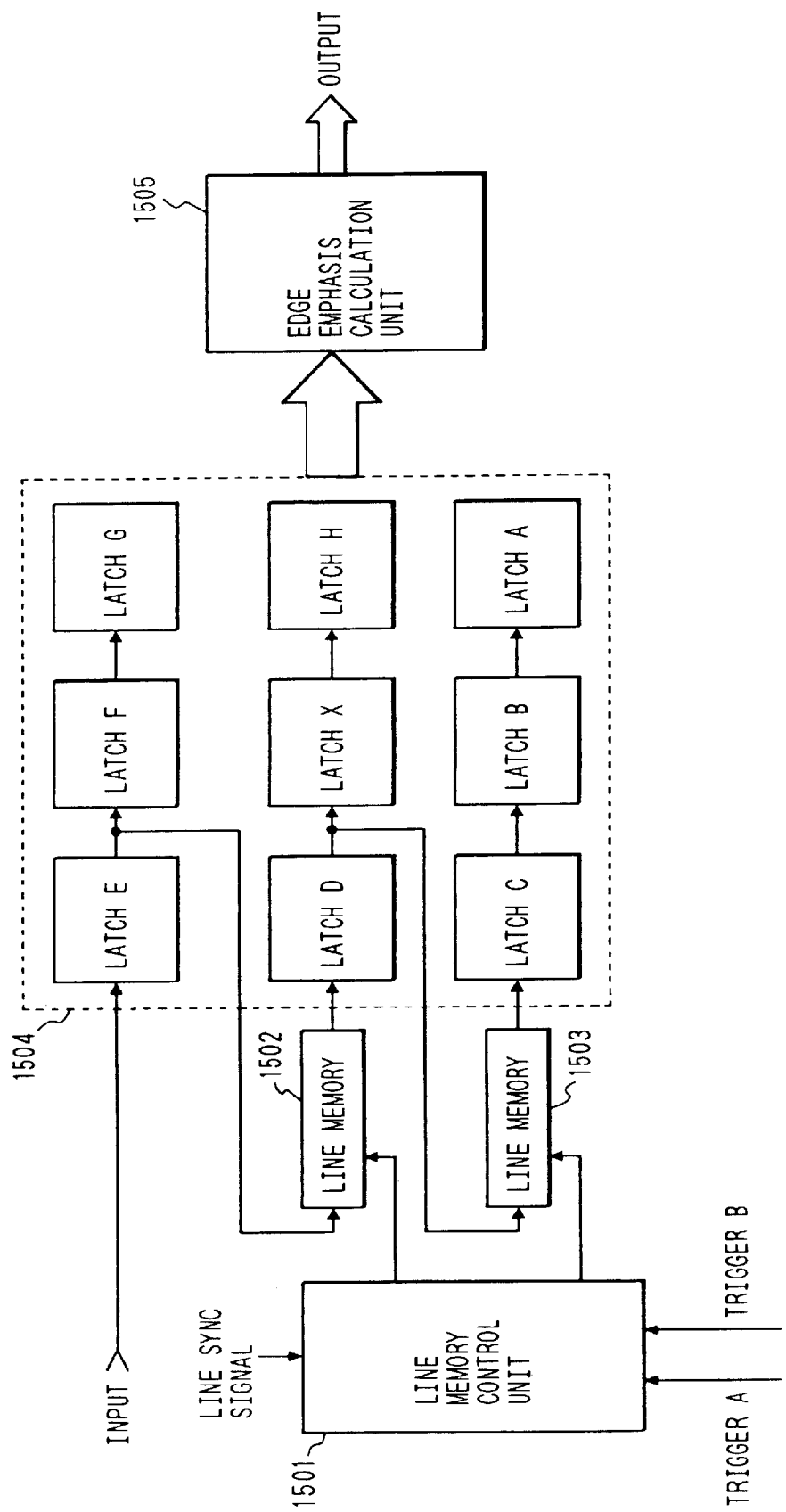

FIG. 16A

| A | B | C |
|---|---|---|
| H | X | D |
| G | F | E |

FIG. 16B

| -1 |   | -1 |
|----|---|----|
|    | 4 |    |
| -1 |   | -1 |

FIG. 19A

| -1 |   | -1 |
|----|---|----|
|    |   |    |
|    | 2 |    |

FIG. 19B

|    | -1 |    |
|----|----|----|
|    |    |    |
| -1 | 3  | -1 |

FIG. 21

|   | * | 2 | 1 |
|---|---|---|---|
| 1 | 3 | 1 |   |

∗ : TARGET PIXEL

IMAGE PROCESSING APPARATUS AND METHOD

This is a continuation of application Ser. No. 08/455,545, filed May 31, 1995.

BACKGROUND OF THE INVENTION

1. Field of the Invention

The invention relates to an image processing apparatus and method for processing image data and, more particularly, to an image processing apparatus and method for obtaining an image of a good picture quality.

2. Related Background Art

Hitherto, according to the standard of a G3 facsimile apparatus, a scanning line density for reading or recording is predetermined to 8 dots/mm for the main scanning direction and to 3.85 lines/mm (standard), 7.7 lines/mm (fine), and 15.4 lines/mm (super fine) for the sub scanning direction.

In almost of the conventional facsimile apparatuses, therefore, both of the reading means and the recording means use a system corresponding to the above scanning line densities. Particularly, with respect to the recording means, in many cases, a thermal recording system is used from viewpoints of easiness of the control and a reduction of a space.

However, in case of the thermal recording paper, since it cannot be preserved because of discoloration and the after-writing (namely, characters or the like are written to the paper after the recording) cannot be performed, a facsimile apparatus using a normal paper as a recording paper is rapidly widespread.

As a normal paper recording system in this case, an LBP (laser beam printer) system or an ink jet system is generally used. However, in such LBP or ink jet recording apparatus, ordinarily, a resolution is set to about 400 dpi and is very higher than a scanning line density of the G3 standard. In case of performing the G3 reception and recording or in case of copying and recording a read original, therefore, a resolution of image data has to be converted in accordance with a resolution of the recording apparatus and, after that, the image data is recorded. A specific example of such a case will now be described hereinbelow.

FIG. 20 shows a block diagram of a conventional normal paper recording facsimile apparatus.

In FIG. 20, reference numeral 2001 denotes a contact sensor unit (CS) to read an original image. In the conventional apparatus, the original image is read at a resolution of 8 dots/mm in the main scanning direction and, for example, 7.7 lines/mm in the sub scanning direction.

Reference numeral 2002 denotes an analog image processing unit for executing analog image processes such as DC reproduction, shading correction, and the like to an analog output of the CS 2001; and 2003 indicates an A/D conversion unit for converting an output of the analog image processing unit 2002 to digital data of multivalues every pixel.

Reference numeral 2004 denotes a luminance/density conversion table unit for LOG converting luminance data of each pixel as an output of the A/D conversion unit 2003 to density data; and 2005 indicates an error diffusion processing unit for executing a half-tone process to multivalue output data of the luminance/density conversion table unit 2004 by an error diffusing method, thereby producing binarized image data.

In the above error diffusing process, a binarizing process of a target pixel is executed by using an error diffusion matrix shown in FIG. 21. As is well known hitherto, according to the error diffusing process, the multivalue pixel data which was inputted is binarized by a predetermined threshold value and errors between the pixel data and the threshold value are two-dimensionally diffused in accordance with weight coefficients of an error diffusion matrix. Thus, a density as a whole image can be preserved and a half-tone image can be falsely obtained. By two-dimensionally diffusing the errors, a smooth half-tone image which is visually beautiful can be obtained.

Reference numeral 2006 denotes a data control unit to control a transfer of image data in accordance with each of the transmission mode, reception mode, and copy mode; 2007 a resolution conversion unit to convert a resolution of the image data to a resolution of a printer when the image data is printed and recorded; 2008 a density correction unit to perform a density correction to the image data which was resolution converted by the resolution conversion unit 2007; and 2009 an ink jet printer to print and record. In the conventional apparatus, a printer of a resolution of (360 dpi×360 dpi) is used.

Reference numeral 2010 denotes a modem to modulate and demodulate the image data upon transmission or reception; 2011 an NCU to control an office line upon transmission or reception; and 2012 a CPU to control each of the above units.

The operation of the conventional apparatus will now be described hereinbelow.

In the transmission mode, a transmission original is read by the CS 2001 at a resolution of 8 dots/mm in the main scanning direction and, for example, 7.7 lines/mm in the sub scanning direction by the selection of the operator. A read output of the original is corrected by the analog image processing unit 2002 and is converted to multivalue digital data every pixel by the A/D conversion unit 2003.

The digital data is LOG converted to the density data by the luminance/density conversion table unit 2004 and is binarized by the error diffusion processing unit 2005, so that the binary image data is outputted. In the conventional apparatus, the image data which is obtained here has a resolution of 8 dots/mm in the main scanning direction and 7.7 lines/mm in the sub scanning direction.

The image data is sent to the modem 2010 by the data control unit 2006 and is modulated to the analog transmission signal and is transmitted to an office line through the NCU 2011.

In the reception mode, the analog transmission signal which arrives from the office line is sent to the modem 2010 through the NCU 2011 and is demodulated to the digital image data. However, a resolution in this instance is set to 8 dots/mm in the main scanning direction based on the G3 standard. It is now assumed that the data of a resolution of, for example, 7.7 lines/mm in the sub scanning direction was received.

The data control unit 2006 transfers the image data to the resolution conversion unit 2007 and its resolution is converted.

Namely, to record the data of (8 dots/mm×7.7 lines/mm) by the ink jet printer 2009 of (360 dpi×360 dpi), pixels are added in accordance with a predetermined pattern of the image data so as to increase the number of pixels in the main scanning direction by about 1.77 times and in the sub scanning direction by about 1.84 times.

In the ink jet system, in case of seeing the whole image, the recording image becomes too dense than the actual original image because of a cause such as a blur of the ink or the like.

Therefore, the density correction unit 2008 executes a density correction by replacing the black pixels to the white pixels in accordance with the pattern of the image data in order to avoid a phenomenon such that the image density when the image is printed by the ink jet printer 2009 seems to be dense due to an increase in number of pixels by the resolution conversion mentioned above.

The data is sent to the ink jet printer 2009 and is recorded as an image at a resolution of (360 dpi×360 dpi).

In the copy mode, the original image read by the CS 2001 is processed in a manner similar to the case in the transmission mode and is obtained from the error diffusion processing unit 2005 at a resolution of, for example, (8 dots/mm× 7.7 lines/mm) as binarized image data.

The image data is transferred to the resolution conversion unit 2007 by the data control unit 2006.

The image data is, further, resolution converted from a resolution of (8 dots/mm×7.7 lines/mm) to a resolution of (360 dpi×360 dpi) by the resolution conversion unit 2007 in a manner similar to the reception mode. In a manner similar to the case of the recording of the reception data mentioned above, in order to avoid that the image becomes too dense as a whole, the density correction unit 2008 inverts the image data from the black pixels to the white pixels and, after that, the data is recorded as an image at a resolution of (360 dpi×360 dpi) by the ink jet printer 2009.

In the conventional apparatus as mentioned above, however, the data after it was binarized by the error diffusing process or the like is resolution converted. Namely, in the copy mode, the image data read by a resolution of for example, (8 dots/mm×7.7 lines/mm) is binarized by the error diffusing process, the pixels are added to resolution convert the image processing pattern obtained to the data of the resolution,(360 dpi×360 dpi) of the printer, and the pixels are further replaced in order to correct the density as a whole image for the above data. Therefore, after the original image was read, the image processing pattern (smooth half-tone image) formed by the error diffusing process is broken by those pixel operations, so that the output image is remarkably deteriorated as compared with the original image. The replacing process of the pixels as mentioned above becomes complicated.

Since an algorithm for the luminance/density conversion ordinarily has only one pattern, the density correction according to the resolutions of the input image data and the image data that is outputted cannot be properly executed. When the processing method at the stage before the resolution conversion is executed differs, even in the case where those resolutions are equal, the density as a whole image seems to be different.

The above points cause large problems since a significance of the copy function is increasing in the widespread of the use of the normal paper as a recording paper as mentioned above.

SUMMARY OF THE INVENTION

The present invention is made in consideration of the above problems and it is an object of the invention to provide image processing apparatus and method which can obtain image data of a high picture quality.

To obtain an output image of a proper density irrespective of an output resolution, it is an object of the invention to provide an image processing apparatus comprising: input means for inputting image data; data converting means for converting density characteristics of the image data inputted by the input means; and output means for outputting the image data at a predetermined resolution, wherein the data converting means converts the density characteristics so as to almost equalize the density even if the resolution of the image data which is outputted by the output means differs.

To prevent a deterioration of a picture quality in association with a resolution conversion, it is an object of the invention to provide an image processing apparatus comprising: input means for inputting image data; data converting means for converting density characteristics of the image data inputted by the input means; resolution converting means for converting a resolution of the image data converted by the data converting means to a predetermined resolution; half-tone processing means for performing a half-tone process to the image data converted by the resolution converting means; and output means for outputting the image data which was half-tone processed by the half-tone processing means by the predetermined resolution, wherein the data converting means converts the density characteristics so as to almost equalize the density of the image data inputted by the input means and a density of predetermined reference data.

To prevent a deterioration of a picture quality by performing a half-tone process after a resolution conversion in accordance with a selected mode, it is an object of the invention to provide an image processing apparatus comprising: input means for inputting image data; resolution converting means for converting a resolution of the image data to a predetermined resolution; half-tone processing means for performing a half-tone process to the image data; output means for outputting the image data at the predetermined resolution; mode selecting means for selecting a mode; and control means for controlling in a manner such that when a copy mode is selected by the mode selecting means, the image data inputted by the input means is converted by the resolution converting means, the converted image data is half-tone processed by the half-tone processing means after that, and the resultant image data is outputted by the output means.

To enable a proper resolution according to a process to be selected, it is an object of the invention to provide an image processing apparatus comprising: input means for inputting image data; input mode selecting means for selecting a mode in case of inputting the image data by the input means; transmission mode selecting means for selecting a transmission mode; and resolution selecting means for selecting a low resolution or a high resolution as a resolution in case of inputting the image data by the input means, wherein the resolution selecting means selects a half-tone mode by the input mode selecting means and, in the case where a memory transmission mode is selected by the transmission mode selecting means, the selection of the high resolution is disenabled.

Another object of the invention is to almost equalize a print density of the reception data and a print density of an output image upon copying.

Still another object of the invention is to improve a picture quality without remarkably adding functions.

The above and other objects and features of the present invention will become apparent from the following detailed description and the appended claims with reference to the accompanying drawings.

BRIEF DESCRIPTION OF THE DRAWINGS

FIG. 1 is a block diagram showing a construction of a main section of a facsimile apparatus according to an embodiment of the invention;

FIGS. 2A and 2B are conceptual diagrams of resolution conversions in the main scanning direction and sub scanning direction;

FIG. 3 is a graph showing a difference between print densities due to a difference of processing methods;

FIG. 9 is a diagram for explaining a step of occurrence of a pseudo outline;

FIG. 10 is a diagram showing an example of an edge emphasis filter;

FIG. 14 is a block diagram showing an example of a detailed construction of a binarization processing unit in FIG. 11;

FIG. 15 is a block diagram showing an example of a detailed construction of an edge emphasis unit in FIG. 14;

FIGS. 16A and 16B are diagrams showing a reference of an edge emphasis filter which is executed by an edge emphasis calculation unit, a position of a target pixel, and filter coefficients;

FIGS. 19A and 19B are diagrams showing other examples of edge emphasis filter coefficients which are set to the edge emphasis calculation unit in FIG. 15;

FIG. 21 is a diagram showing an example of a weight matrix which is used in an error diffusing method.

DETAILED DESCRIPTION OF THE PREFERRED EMBODIMENTS

Figure 4:
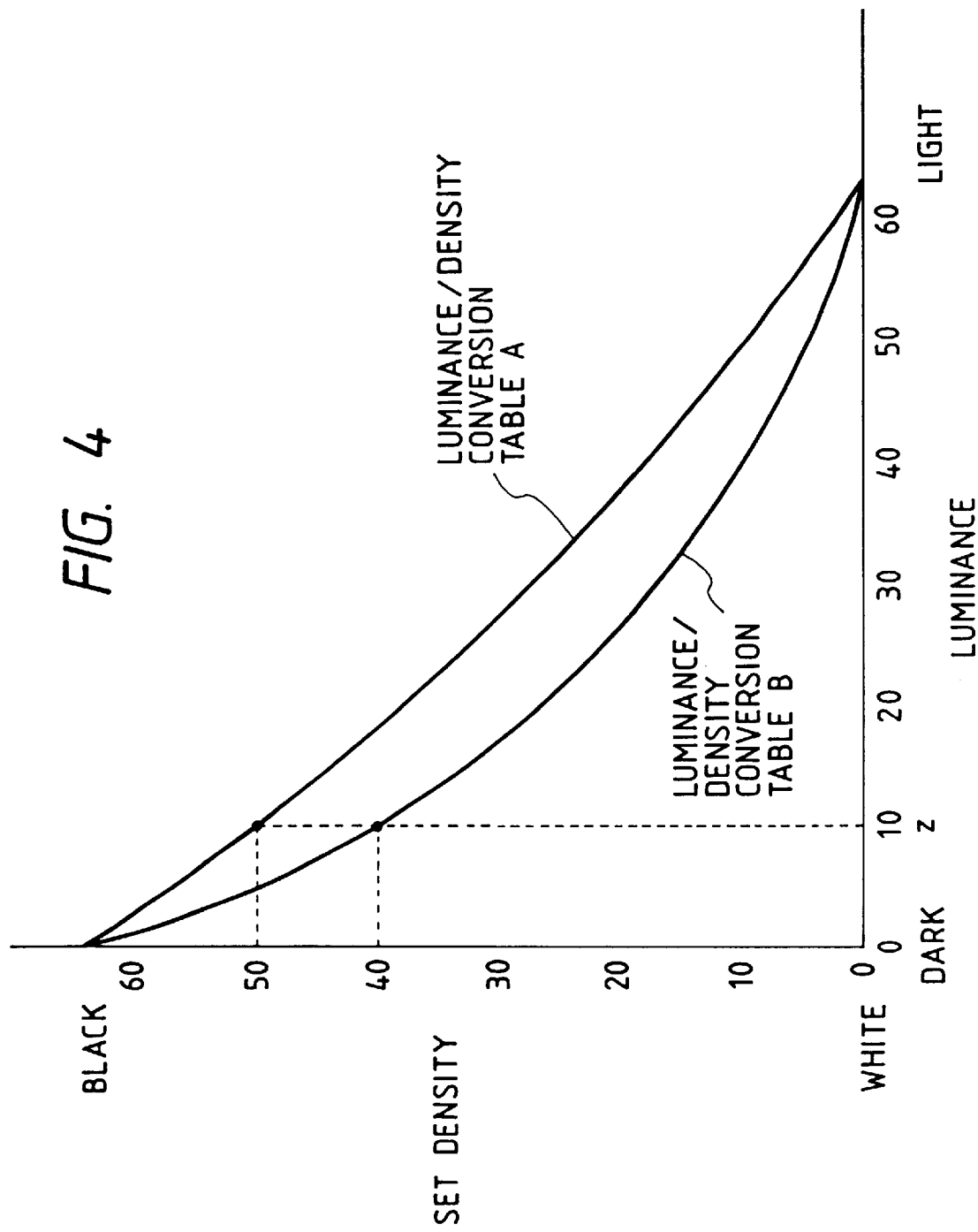
FIG. 4 is a diagram showing an example of a luminance/density conversion table.

An embodiment of the invention will now be described in detail hereinbelow with reference to the drawings.
[First embodiment]

FIG. 1 is a block diagram showing a construction of a main section of a facsimile apparatus as an example of an image processing apparatus according to the invention. Reference numeral 101 denotes a contact sensor unit (CS) to read an original image. A luminance value is read at a resolution of (8 dots/mm×3.85 lines/mm), (8 dots/mm×7.7 lines/mm), or (8 dots/mm×15.4 lines/mm).

Reference numeral 102 denotes an analog image processing unit for executing analog image processes such as DC reproduction, shading correction, and the like to an analog output of the CS 101; and 103 indicates an A/D conversion unit for converting an output of the analog image processing unit 102 to digital data of multivalues every pixel. Reference numeral 104 denotes a luminance/density conversion table unit for converting luminance data of each pixel as an output of the A/D conversion unit 103 to desired density data; 105 a resolution conversion unit A to resolution convert the multivalue image data converted by the luminance/density conversion table unit 104 to a desired resolution. The resolution conversion unit A can convert the resolution by thinning out or interpolating the multivalue image data of one pixel. Reference numeral 106 indicates an error diffusion processing unit for executing a half-tone process to output data of the luminance/density conversion table unit 104 or resolution conversion unit A 105 by an error diffusing method, thereby producing binarized image data.

Reference numeral 107 denotes a data control unit to control a transfer of image data in accordance with each of the transmission mode, reception mode, and copy mode and 108 indicates a resolution conversion unit B to convert a resolution of the binary image data to a desired resolution. The resolution conversion unit B can convert the resolution by thinning out or interpolating the binary image data of one pixel. Reference numeral 109 denotes a density correction unit for performing a density correction by an inversion of black pixels to the image data which was resolution converted by the resolution conversion unit B 108. Reference numeral 110 denotes an ink jet printer to perform the printing and recording. In the apparatus of the embodiment, a printer of a resolution of 360 dpi is used.

Reference numeral 111 denotes a modem to modulate or demodulate the image data upon transmission or reception; 112 an NCU to control the office line upon transmission or reception; and 113 a CPU to control each of the above units.

Reference numeral 114 denotes a switching unit A to select whether the resolution is converted or not. Namely, when the switching unit A is connected to a terminal 114a side, the resolution is converted by the resolution conversion unit A 105. When the switching unit A is connected to a terminal 114b side, the image data is directly transmitted to the error diffusion processing unit 106 without performing the resolution conversion. Reference numeral 115 denotes a switching unit B to select whether the resolution is converted or not. Namely, when the switching unit B is connected to a terminal 115a side, the resolution is converted by the resolution conversion unit B 108. When the switching unit B is connected to a terminal 115b side, the image data is directly transmitted to the ink jet printer 110 without performing the resolution conversion.

Since the resolution conversion unit to convert the resolution of the binary data upon reception and the resolution conversion unit to convert the resolution of the multivalue data upon copying are separately provided, each process can be efficiently executed by a simple construction such that the switching units are switched. A proper resolution conversion according to each process can be performed.

A flow of the image data will now be described.

In the transmission mode, first, the transmission original is read by the CS 101 at a resolution of, for example, (8 dots/mm×7.7 lines/mm) by the selection of the operator. A read output is corrected by the analog image processing unit 102 and is converted to multivalue digital pixel data every pixel by the A/D conversion unit 103.

The digital data is converted to the density data by the luminance/density conversion table unit 104. The switching unit A 114 is connected to the terminal 114b side, so that the density data is subjected to the image process by the error diffusion processing unit 106 and the binarized image data is outputted. In the apparatus of the embodiment, the transmission image data that is obtained here has a resolution of (8 dots/mm×7.7 lines/mm).

The image data is sent to the modem 111 from the data control unit 107 and is modulated to the analog transmission signal and is sent to the office line through the NCU 112.

In the reception mode, the analog transmission signal which arrives from the office line is subsequently transmitted to the modem 111 through the NCU 112 and is demodulated to the digital image data.

In this instance, the data has a resolution of, for example, (8 dots/mm×7.7 lines/mm) based on the G3 standard.

The data control unit 107 connects the switching unit B 115 to the terminal 115*a* side and transfers the image data to the resolution conversion unit B 108 and converts the resolution of the binary image data.

Namely, to record the data of a resolution of (8 dots/mm× 7.7 lines/mm) by the ink jet printer 110 of a resolution of (360 dpi×360 dpi), pixels are added in accordance with the pattern of the image data so as to increase the number of pixels by about 1.77 times in the main scanning direction and by about 1.84 times in the sub scanning direction.

Since the number of pixels is increased by the above resolution conversion, the density correction unit 109 replaces the black pixels to the white pixels in accordance with the pattern of the image data and executes the density correction in order to avoid that the image density as a whole image becomes apparently dense when the image is printed by the ink jet printer 110.

The image data is sent to the ink jet printer 110 and an image is recorded at a resolution of (360 dpi×360 dpi).

In the copy mode, the original image is read by the CS 101 at a resolution of, for example, (8 dots/mm×15.4 lines/mm) and is converted to the density data by the luminance/density conversion unit 104, thereby obtaining the image data of multivalues.

By connecting the switching unit A 114 to the terminal 114*a* side, the multivalue image data is sent to the resolution conversion unit A 105 and the resolution of the image data is converted so as to obtain a recording resolution of (360 dpi×360 dpi) of the ink jet printer 110. The converted image data is subjected to a half-tone process by the error diffusion processing unit 106 and the binarized image data is outputted. The image data obtained here is the binary image data of (360 dpi×360 dpi). After the resolution conversion according to the recording resolution was performed by the resolution conversion unit A 105, the image data is binarized by the error diffusing method by the error diffusion processing unit 106. Thus, the image data adapted to the printer can be derived without breaking the smooth image processing pattern due to the error diffusing process.

The image data is recorded by the ink jet printer 110 and is outputted by connecting the switching unit B 115 to the terminal 115*b* side by the data control unit 107.

A principle of the resolution conversion will now be described.

In the facsimile apparatus having a printer such that a recording resolution differs from a reading resolution or a recording resolution differs from the resolution of the facsimile communication, since it is necessary to record at an equal magnification as the original upon reception or copying, a resolution converting circuit is necessary. For example, in the case where the image data read by a resolution of (8 dots/mm×7.7 lines/mm) is recorded by a head of (360 dpi×360 dpi), if it is recorded by corresponding one recording pixel to one reading pixel, an image is recorded at the following reduction ratios.

Main scanning direction:

$$\{8(dots/mm)\}/\{360(dpi)\}=0.564$$

Sub scanning direction:

$$(7.7(lines/mm))/(360(dpi))=0.543$$

Therefore, when developing the original data of 9 bits to 16 bits in the main scanning direction and when developing 6 bits to 11 bits in the sub scanning direction, Main scanning direction: 0.564×(16/9)=1.003

Sub scanning direction: 0.543×(11/6)=0.996

Therefore, the image data can be recorded at an almost equal magnification.

FIGS. 2A and 2B show a principle of the resolution conversion described above. FIG. 2A shows the resolution conversion in the main scanning direction. FIG. 2B shows the resolution conversion in the sub scanning direction. Reference numeral 2*a* denotes a resolution conversion in the main scanning direction.

By replacing a read pixel 21*a* to two recording pixels 21*a*' and by replacing a read pixel 23*a* to one recording pixel 23*a*', the equal magnification recording in the main scanning direction can be performed. Reference numeral 2*b* denotes a resolution conversion in the sub scanning direction. By replacing one line 21*b* of the read pixel to two lines 21*b*' of the recording pixels and by replacing one line 23*b* of the read pixel to one line 23*b*' of the recording pixel, the equal magnification recording in the sub scanning direction can be performed. As an example other than the above example, in the case where the image data read at a resolution of (8 dots/mm×15.4 lines/mm) is converted to the data of (360 dpi×360 dpi), an image is recorded at the following magnifications.

Main scanning direction:

$$\{8(dots/mm)\}/\{360(dpi)\}=0.564$$

Sub scanning direction:

$$\{15.4(lines/mm))/(360(dpi)\}=1.087$$

Therefore, by converting the image data in the main scanning direction in a manner similar to that mentioned above and by developing 25 bits to 23 bits in the sub scanning direction, Main scanning direction: 0.564×(16/9)=1.003

Sub scanning direction: 1.087×(23/25)=1.000

Thus, the image data can be recorded at an almost equal magnification. The above operation is executed by the resolution conversion unit A 105 or B 108 in FIG. 1.

The apparatus also executes an operation for converting the resolution to 324 dpi in order to reduce the image data to 90%. Whether such a resolution conversion is executed by the resolution conversion unit A 105 in FIG. 1 or by the resolution conversion unit B 108 in FIG. 1 is determined by operating the switching unit A 114 in FIG. 1 and the switching unit B 115 in FIG. 1. The operations of the switching units A 114 and B 115 in FIG. 1 are controlled by the CPU 113 in FIG. 1. The control of the switching unit is determined in accordance with the operating mode. In the transmission mode, the switching unit A 114 in FIG. 1 is connected to the terminal 114*b* side and the image data is transmitted to the error diffusion processing unit 106 in FIG. 1. In the reception mode, the switching unit B 115 in FIG.

1 is connected to the terminal 115a side and the image data is transmitted to the resolution conversion unit B 108 in FIG. 1 and the resolution of the binary image data is converted. In the copy mode, the switching unit A 114 in FIG. 1 is connected to the terminal 114a side and the image data is transmitted to the resolution conversion unit A 105 in FIG. 1 and the resolution of the multivalue image data is converted. The switching unit B 115 in FIG. 1 is connected to the terminal 115b side and the image data is sent to the ink jet printer 110 in FIG. 1.

As mentioned above, finally, even in case of the same resolution, the resolution conversion is performed by the resolution conversion unit B 108 in FIG. 1 in the reception mode, while the resolution conversion is executed by the resolution conversion unit A 105 in FIG. 1 in the copy mode. In the resolution conversion by the resolution conversion unit A 105 and the resolution conversion by the resolution conversion unit B 108, the resolution is converted by the same method such that the data of one pixel is thinned out or interpolated. However, since the processes in the halfway, namely, the processes at the stage before the resolution conversion is executed differ, even in case of the same printer, OD values of the print densities are different. Even in the case where the resolution upon reading or the resolution upon reception differs, the OD values are different depending on the process of the resolution conversion. In the embodiment, therefore, a recording density upon reception is used as a reference and in order to match the recording density in the copy mode with the reference density, a luminance/density conversion table 104 in FIG. 1 is newly provided in the copy mode separately from that in the transmission mode, thereby coping with such a case. Namely, upon transmission, the resolution of the receiver in the main scanning direction is presumed to be 8 dots/mm and a luminance/density conversion table according to such a resolution is provided. In the copy mode, since the recording resolution in the main scanning direction is equal to 360 dpi, a luminance/density conversion table according to such a resolution is newly provided.

FIG. 3 shows OD values in case of measuring print densities when the data of 64 gradations obtained by reading a predetermined pattern comprising a half-tone image is recorded as in the conventional example so far and when it is recorded as shown in the embodiment.

Even in case of the same gradation, the image data is printed at different densities because of a difference between the above printing method (method of performing the resolution conversion after the error diffusing process was executed; hereinafter, such a method is referred to as a printing method A) and a newly embodied printing method (method of performing the resolution conversion before the error diffusing process is executed; hereinafter, referred to as a printing method B). In case of the same pattern, the image pattern can be printed at the same density by providing a luminance/density conversion table every reading resolution for the luminance/density conversion table unit 104 in FIG. 1. FIG. 4 shows the luminance/density conversion tables A and B to print the same pattern at the same density. The printing method A is a printing method in the reception mode. The printing method B is a printing method in the copy mode.

A method of deciding the luminance/density conversion table is shown. First, the luminance/density conversion table A of a predetermined reading resolution as a fundamental resolution is decided. The printing method A is used as a reference here. An attention is paid to FIG. 3 and when a gradation x=50, the OD value is equal to 1.0 in case of the printing method A and is equal to 1.13 in case of the printing method B. It is now intended to correct the OD value 1.13 to 1.0. The OD value in the printing method B is equal to 1.0 when a gradation y=40. In the luminance/density conversion table A in FIG. 4, a luminance z=10 at the set density corresponding to the gradation x=50. The luminance/density conversion table B is replaced to the gradation y=40 corresponding to the set density when the luminance z=10. The above process is executed with respect to all of the gradations 0 to 63. Thus, the same pattern can be printed at the same density. By executing such a process for all of the gradations provided, the table to print the same pattern at the same density can be formed.

In the apparatus of the embodiment, the reduction copy of 90% can be performed. Namely, by resolution converting the read image data to 324 dpi and recording the converted image data by the printer of 360 dpi, the image data can be printed with a recording width of 324/360=90%. In this instance, since the recording resolution is set to 324 dpi, the density characteristics differ from those in case of 360 dpi.

Therefore, by also executing a method similar to the operation to decide the table B as mentioned above with respect to 324 dpi, a luminance/density conversion table C is decided.

In case of recording resolutions other than the above resolutions, each luminance/density conversion table so as to equalize the density as a whole image with that of the reference table A is prepared for each resolution that is used.

As mentioned above, the luminance/density conversion tables are provided for all of the recording resolutions and the luminance/density conversion tables according to the kinds of reading resolution and recording resolution are selected. Consequently, the same pattern can be printed at the same density as a whole image even when any one of the recording resolutions prepared is selected. In addition, since it is sufficient to refer to the contents of the table, the luminance data can be converted to desired density data at a high speed.

According to the embodiment as mentioned above, when the image of the same pattern is inputted and recorded, it can be printed at a similar density as a whole image irrespective of a difference of the resolution of the input image or the recording resolution. Since each table is formed by setting the print density when the image of a predetermined pattern is received at a predetermined resolution to a reference density, the image can be printed at an equal density even in case of a different process such as copy and recording of the reception data. In the copy mode, before the half-tone process such as an error diffusing process or the like is executed, the resolution conversion according to the recording resolution is executed. Therefore, it is possible to prevent that the pattern is broken by the half-tone process.

[Second embodiment]

The foregoing first embodiment has been shown and described with respect to the example in which the image density is controlled in case of using the ink jet printer 110 for recording the image at the resolution of (360 dpi×360 dpi). In the second embodiment, which will be explained hereinbelow, the ink jet printer 110 is made detachable, thereby coping with the recording by a plurality of kinds of pixel densities. Namely, by reducing a diameter of an ink nozzle, a size of one pixel is changed and a degree of blur of the ink also differs. Since the pixel density is different, a density as a whole image differs depending on the overlap relation of the pixels recorded. Namely, the density of a whole image differs in accordance with a size of overlapped portion of the ink. The image density is controlled to eliminate those influences.

Figure 5:
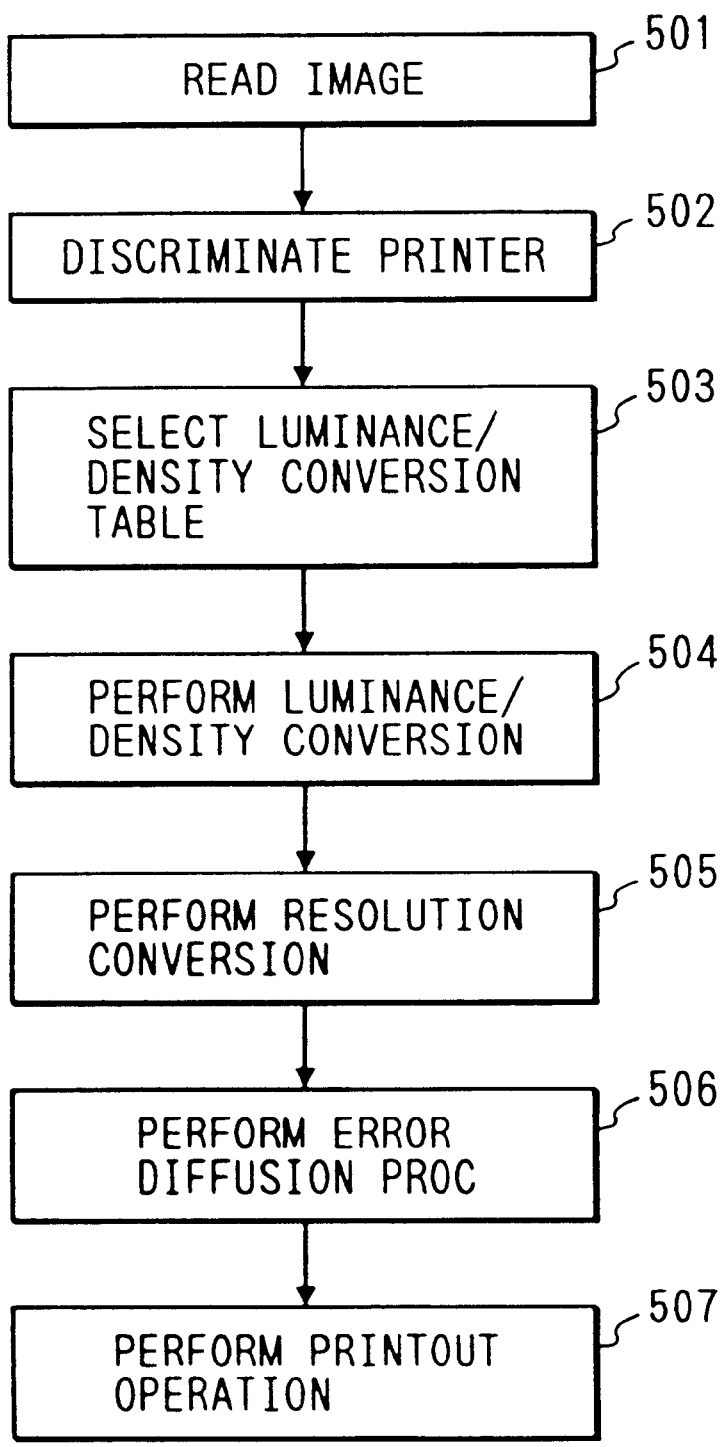
FIG. 5 is a diagram showing a flow of processes in the second embodiment.

A flow of processes in the above case will now be described hereinbelow with reference to FIG. 5.

The case of the copying process will now be described here. First in step 501, the original image is read by the CS 101. In this example, the image can be automatically read at a predetermined resolution (for instance, 8 dots/mm×15.4 lines/mm) or can be also read at the resolution selected by the operator.

In step 502, the pixel density of the ink jet printer 110 is discriminated. The ink jet printer 110 is detachable. It is now assumed that by attaching the printer to-the attaching portion, the pixel density can be discriminated. For example, the ink jet printer of (720 dpi×720 dpi) is used.

In step 503, the luminance/density conversion table according to the reading resolution and the recording resolution (it is now assumed that the equal -magnification is used) is selected. As mentioned above, the table is previously formed every reading resolution by setting the printing method A (also a print density in case of printing at 360 dpi×360 dpi here) to a reference as mentioned above.

In step 504, the luminance data read by the CS 101 is converted to desired density data on the basis of the luminance/density conversion table selected in step 503. The data obtained here is the multivalue image data per one pixel.

In step 505, the resolution conversion is executed by the resolution conversion unit A 105 in accordance with the recording resolution of the ink jet printer 110. For example, when the image is read at a resolution of (8 dots/mm×15.4 lines/mm), it is converted to (720 dpi×720 dpi).

In step 506, the multivalue image data of one pixel is half-tone processed by the error diffusion processing unit 106 and the binarized image data is outputted.

In step 507, the binarized image data is recorded and outputted at a resolution of (720 dpi×720 dpi) by the ink jet printer 110.

According to the second embodiment as mentioned above, the luminance/density conversion table is formed in consideration of an overlap degree of the ink due to the difference of the pixel density (interval between the pixels) and the print density in case of printing at (360 dpi×360 dpi) is set to the reference density. Therefore, the densities as a whole image can be almost equalized irrespective of the difference of the pixel densities.

According to the present invention as described above, even when the resolution upon recording and outputting differs, an output image of a similar density can be obtained.

The densities when they are seen as a whole image in the case where the reception data is recorded and outputted and the case where the copy image is recorded and outputted can be equalized.

Although the error diffusing method has been used as a half-tone process in the above embodiment, the invention is not limited to such a method. The invention can be also applied to an average density preserving method of falsely executing a half-tone process by an image processing pattern in a manner similar to the error diffusion method or the like.

[Third embodiment]

The third embodiment will now be described.

In the following third embodiment, in the case where it is previously known that the resolution of an input image is converted in accordance with a mode to be executed, by executing the resolution conversion before binarization, a deterioration of a picture quality is prevented. Explanation will now be made in detail hereinbelow.

First, the pixel density conversion will be again simply explained.

The pixel density conversion is a process to increase or decrease the number of pixels of the input image data in accordance with a resolution of an output apparatus and is fundamentally the same as the enlargement or reduction of an image. For example, to pixel density convert the image data of the A4 size in which the number of pixels is equal to 1728×2287 and a resolution is set to 203.2 dpi (8 dots/mm) in the main scanning direction and is set to 195.58 dpi (7.7 lines/mm) in the sub scanning direction to the image data of a resolution of 406.4 dpi (16 dots/mm) in the main scanning direction and 391.16 dpi (15.4 lines/mm) in the sub scanning direction, it is sufficient to convert one pixel to four pixels and to obtain the pixels in which the total number of pixels is equal to 3456×4575. Such a process is actually the same as a process to enlarge the pixels two times in each of the scanning directions. In the following description, it is assumed that all of the processes for the resolution conversion, enlargement and reduction, pixel density conversion, and the like denote the digital enlarging and reducing processes.

At which stage of the image data processes in the facsimile apparatus the pixel density conversion is executed will now be described.

The G3/G4 facsimile apparatus generally handles binary data in the accumulation and transmission and reception of image data. Therefore, since the image data which has already been stored as an image file in a memory and the image data received via the line are the binary images, the method for the binary image is used to execute the pixel density conversion and enlargement and reduction to those binary image data. As such a method, an SPC method, a nine-dividing method, a projecting method, etc. has been proposed. In the embodiment, the processes such as a pixel density conversion and the like are executed to the multivalue image data before it is stored in the image file, namely, before it is binarized as image data facsimile.

The binarizing method is used in case of executing and error diffusion or a method of least average error to express pseudo gradations.

According to a pseudo gradation method by the binary image using the error diffusion or the like, a density is expressed at a ratio of the number of white and black dots per unit area. For example, in case of expressing a density 16 among 64 gradations, sixteen black dots as an average exist in a block of (8×8) pixels. The error diffusing method is a binarizing method in which both of the resolution and the gradation are satisfied as compared with the dither method. However, on the contrary, when a pixel size expressing one pixel is large, namely, when the recording resolution is relatively coarse as in the G3 facsimile, an own striped pattern due to a periodic dot pattern becomes conspicuous.

Therefore, to utilize an advantage of the error diffusing method, it is necessary that by executing the pixel density conversion before the image data is binarized by the error diffusing method, the high resolution data is obtained and, after that, it is binarized. However, even in a facsimile apparatus having a recording apparatus of a resolution of 406.4 dpi, in all of the cases also including the case in the copy mode, the binarizing process is executed at a resolution of 203.3 dpi from the relation with the transmission and reception data and the data is enlarged four times and recorded upon recording.

In the embodiment, therefore, when it is previously known that the recording apparatus has a high resolution as in case of copying or the like, the pixel density conversion is executed at the stage of the multivalue data before binarization and, after that, the converted data is binarized by the error diffusing method, thereby setting the display resolution of the error diffusion to the high resolution and reducing the size of one pixel for density displaying. Thus, a print image in which the own striped pattern due to the error diffusing method is inconspicuous can be obtained.

Figure 6A:
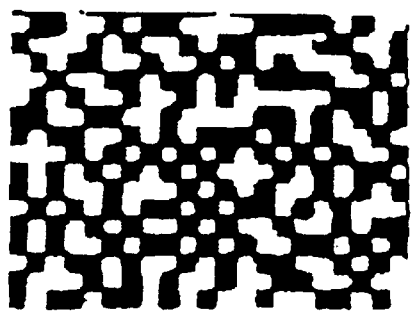
FIGS. 6A and 6B are diagrams showing examples of binary images due to an error diffusion in the case where recording resolutions are different by two times with respect to each of the main and sub scanning directions.
Figure 6B:
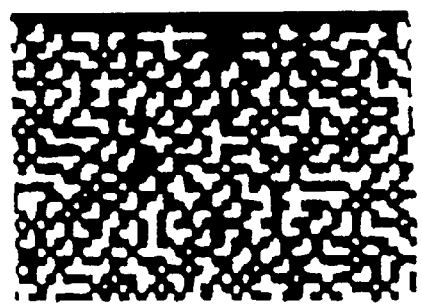

FIGS. 6A and 6B show samples of binarized images due to the error diffusion in the case where the recording resolutions are different by two times with respect to each of the main and sub scanning directions. In the image shown in FIG. 6B, the pixel size of one dot is smaller than that of FIG. 6A and there is a more uniform impression.

Figure 7A:
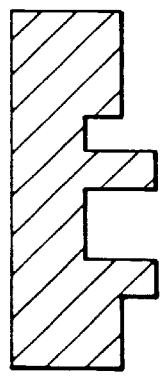
FIGS. 7A and 7B are diagrams in each of which a part of a diagram having edge portions is enlarged.
Figure 7B:
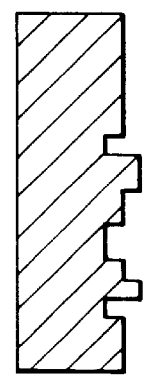

FIGS. 7A and 7B are diagrams in each of which a part of a diagram having edge portions is enlarged. According to the image shown in FIG. 7B, after the pixel density conversion was performed, by performing the error diffusion, a notch of the edge portion is smaller as compared with FIG. 7A and an image of a sharp edge can be obtained.

In the embodiment, after an edge emphasis as a resolution compensation was performed to the image data read by a CCD (charge coupled device), the pixel density conversion is executed. According to the edge emphasizing process, the image data is subjected to a two-dimensional differentiation of second order and the resultant data is added to target image data. The reason why the pixel density conversion is executed after the edge emphasis is because if the edge emphasis is performed after the pixel density conversion was executed as a simple superimposing process, a high frequency component is superimposed by a Laplacian arithmetic operation in the image space which was superimposed, so that a pseudo outline is generated in the edge portion of the image.

Figure 8:
FIG. 8 is a diagram showing an example of an image in which pseudo outlines occur.

FIG. 8 is a diagram showing an example of an image in which pseudo outlines were generated. After a square image of a whole black was enlarged two times by the simple superimposing process in both of the main and sub scanning directions, an edge emphasis is executed, thereby binarizing the image. A state of the generation of the pseudo outlines is shown.

FIG. 9 is a diagram for explaining a step of generating pseudo outlines.

For simplicity of explanation, image data is considered as one-dimensional data here. As shown in FIG. 5, coefficients of an edge emphasis filter assume [−1, 2, −1].

The upper stage in FIG. 9 shows a result in the case where after the image was enlarged two times by the simple superimposing process, the edge emphasizing process is executed by a filter of FIG. 10. The lower stage shows a result in the case where after the edge emphasizing process was performed by the above filter, the simple superimposing process is executed.

Now, assuming that a binarization threshold is set to 30, in the process shown at the upper stage of FIG. 9, image data D2 of the edge portion becomes white by the edge emphasizing process and image data D2 formed by the superimposing process becomes black. This result appears as a pseudo thin line. On the other hand, in the process shown at the lower stage, such an inconvenience doesn't occur.

From the above reasons, in the embodiment, when it is previously known that the output resolution is a high resolution, the input multivalue image data is binarized by the following processing flow.

1) The edge emphasis for resolution compensation is executed to the input multivalue image data.
2) The pixel density conversion according to the output resolution is executed to the image data which was edge emphasized.
3) The image data which was pixel density converted is binarized by the error diffusing method or the like.

Although an example of performing the luminance density conversion after the edge emphasis will be described hereinbelow, as will be obviously understood from the above explanation, it is sufficient to execute the luminance density converting process between the edge emphasizing process and the binarizing process. The luminance density converting process can be also executed after the enlarging process.

An image data amount will now be described.

As described above, to improve the image quality, it is desirable to perform the pixel density conversion before the binarization. However, on the contrary, there is a drawback such that the data amount increases because the image data after the binarization is outputted as image data of a high resolution. In particular, in the case where the image data is encoded by an encoding method such as MH, MR, MMR, or the like and is accumulated, the image data obtained by the error diffusing process contrarily increases by the encoding. Thus, the data amount further causes a problem.

Therefore, according to the embodiment, in order to reduce the problem of the increase in data amount for a general facsimile apparatus or the like, only in the case where it is previously known that the output resolution is a high resolution as in the copy mode, a direct transmission mode to start the reading operation after a partner apparatus was recognized by a communication protocol, or the like, the pixel density conversion is executed before the binarization.

A flow of image data in the embodiment and a specific constructional example of a binarization processing unit will now be described in detail hereinbelow.

Figure 11:
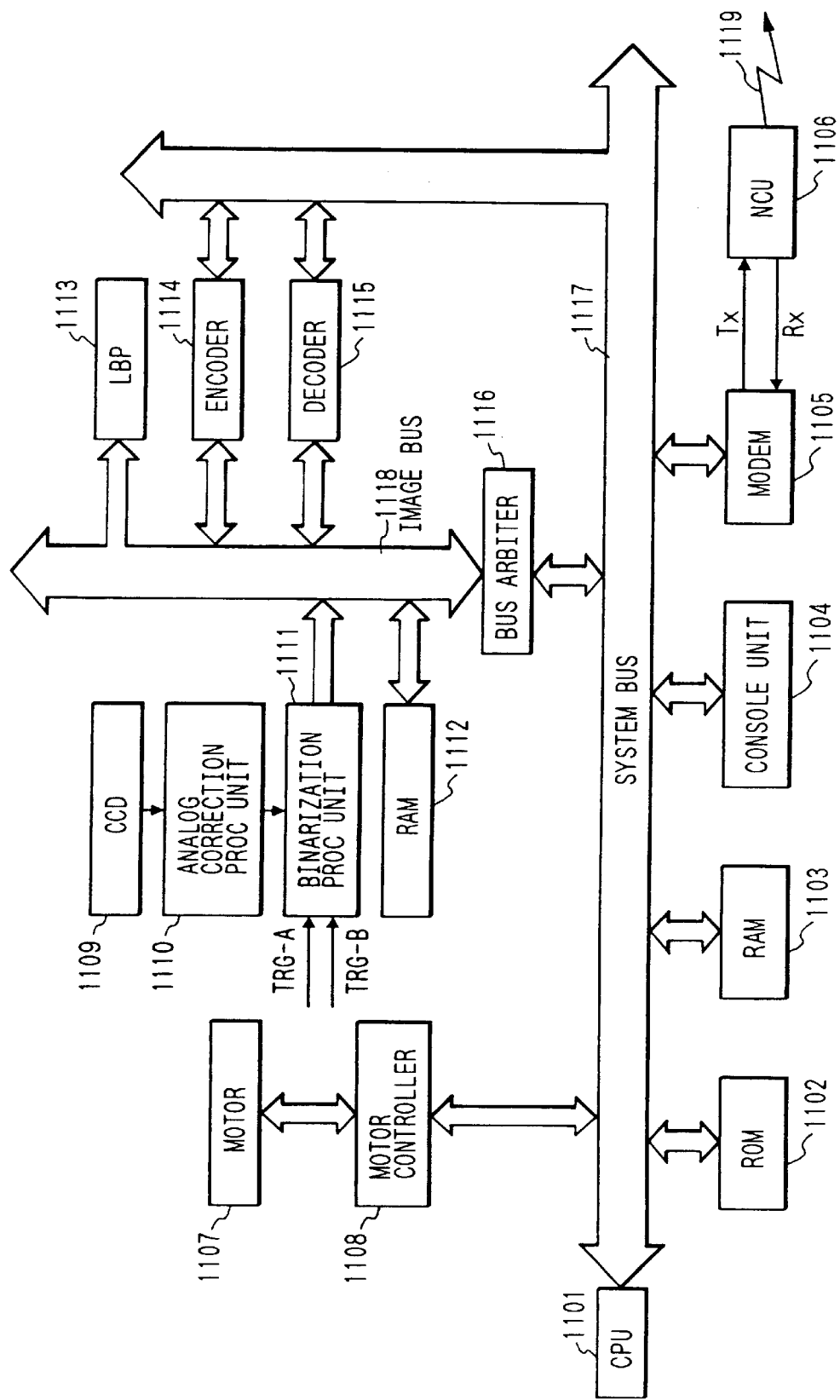
FIG. 11 is a block diagram showing an example of a construction of a facsimile apparatus having an image processing apparatus according to the third embodiment of the invention.

FIG. 11 is a block diagram showing a constructional example of a facsimile apparatus having an image processing apparatus of the third embodiment according to the invention.

In the diagram, reference numeral 1101 denotes a CPU for executing a control of the whole facsimile apparatus, image processes, and the like through a system bus 1117 in accordance with a program stored in an ROM 1102. Information to be displayed to a console unit 1104 and font data and display data to output a report have previously been recorded in the ROM 1102. Reference numeral 1103 denotes an RAM which is used to store data for operation of the CPU 1101 and to store image files of the encoded image data, received image data, and the like.

Reference numeral 1104 denotes the console unit corresponding to a section which functions as a user interface of the facsimile apparatus and has a display such as an LCD or the like, a keyboard, a touch panel, and the like. The console unit 1104 displays an operating state and set conditions of the facsimile apparatus sent from the CPU 1101 and inputs an instruction from the user to the CPU 1101.

Various kinds of modes can be selected by the console unit 1104. The copy mode, transmission mode, and the like can be selected. In the copy mode, a single copy mode to copy the original to one recording paper and a multicopy mode to copy the same original to a plurality of recording papers can be selected. In the transmission mode, a direct transmission mode to transmit an original image while reading the original and a memory transmission mode to transmit original images of the whole original after they were once stored in a memory.

A reading mode can be also selected by the console unit 1104. In the reading mode, a character mode to read an original comprising characters or figure and a photograph mode (half-tone mode) to read a half-tone original such as a photograph or the like can be selected. The resolution in the sub scanning direction when reading can be selected by the operation unit 1104. Namely, a standard mode (97.79 dpi), a fine mode (195.58 dpi), and a super fine mode (391.16 dpi) can be selected.

The embodiment will now be described with respect to the case where the photograph mode is selected. In the reading mode, the original is read at a resolution selected by the operator, namely, in a resolution of 203.2 dpi in the main scanning direction and a resolution of either one of the above three kinds of resolutions in the sub scanning direction. In the photograph mode and in the memory transmission mode, only two kinds of standard mode and fine mode can be selected as resolutions in the sub scanning direction. This is because, in general, although almost of the facsimile apparatuses can receive and record the images transmitted in the standard mode and fine mode, there is also a case where the image in the super fine mode cannot be received and recorded. Therefore, after the original was read in the super fine mode and was subjected to the half-tone processed and was binarized, when the binarized data is stored in the memory and is transmitted, if the partner side cannot receive it in the super fine mode, a thinning-out process or the like has to be executed on the transmission side. After the image data was binarized by the half-tone process, if the resolution conversion such as a thinning-out process or the like is executed, the pattern by the half-tone process is broken and a picture quality is deteriorated. Accordingly, by constructing such that only the standard mode and fine mode can be selected, there is no need to perform the resolution conversion and the deterioration of the picture quality can be prevented. Since an encoding efficiency of the half-tone image is low, by not using the super fine mode, the data amount is reduced and the memory capacity can be also saved.

The reading resolution in the copy mode can be also preset or can be also selected by the operator.

Reference numeral 1105 denotes a modem for modulating the encoded image data and demodulating the received data. Reference numeral 1106 denotes an NCU for interfacing a line 1119 and the facsimile apparatus.

Reference numeral 1108 denotes a motor controller to drive a motor 1107 for moving the original in accordance with an instruction of the CPU 1101. For example, a stepping motor is used as a motor 1107. The motor controller 1108 generates a phase switching control signal and controls the motor 1107.

Reference numeral 1109 denotes a CCD for reading the image of the original one line by one at a resolution of 203.2 dpi and outputs an image signal in the transmission mode, copy mode, or the like. Reference numeral 1110 denotes an analog correction processing unit for performing correcting processes regarding a shading correction and a substratum density of the original to the image signal inputted from the CCD 1109 and outputs a digital image signal of, for example, 64 gradations of 6 bits/pixel by an A/D converter (not shown).

Reference numeral 1111 denotes a binarization processing unit for binarizing the digital image signal of a resolution of 203.2 dpi and 6 bits/pixel which was inputted from the analog correction processing unit 1110 and outputs the binarized signal to an image bus 1118. In the case where the recording resolution is previously known as in the copy mode or the like, the binarization processing unit 1111 executes the pixel density conversion according to the recording resolution. For example, in the ordinary memory transmission mode, the image signal is binarized at a resolution of 203.2 dpi. In the copy mode, after the pixel density conversion to the resolution of 406.4 dpi was performed in accordance with the recording resolution, the signal is binarized.

Reference numeral 1112 denotes an RAM which is connected to the image bus 1118 and is used as a line buffer to temporarily store the binarized image data or the decoded image data. Reference numeral 1113 denotes an LBP (laser beam printer) for printing and outputting the binary image data developed in the RAM 1112; 1114 an encoder for inputting and encoding the image data developed in the RAM 1112 and, after that, for transferring the encoded data to the RAM 1103 through the system bus 1117; and 1115 a decoder for inputting the encoded data stored in the RAM 1103 through the system bus 1117, for decoding it, and after that for developing the decoded image data into the RAM 1112. In the case where an encoding method of the encoded data which has already been stored in the RAM 1103 differs from an encoding method of data to be transmitted as in the case where the image which was encoded by an MMR method and stored is transmitted by an MH method or the like, the encoding conversion is executed in accordance with such an encoding method by using the encoder 1114, decoder 1115, and RAM 1112.

Reference numeral 1116 denotes a bus arbiter for arbitrating the image bus 1118 and system bus 1117 when a header image or a footer image is developed to the RAM 1112 by the CPU 1101 or the like.

Figure 12:
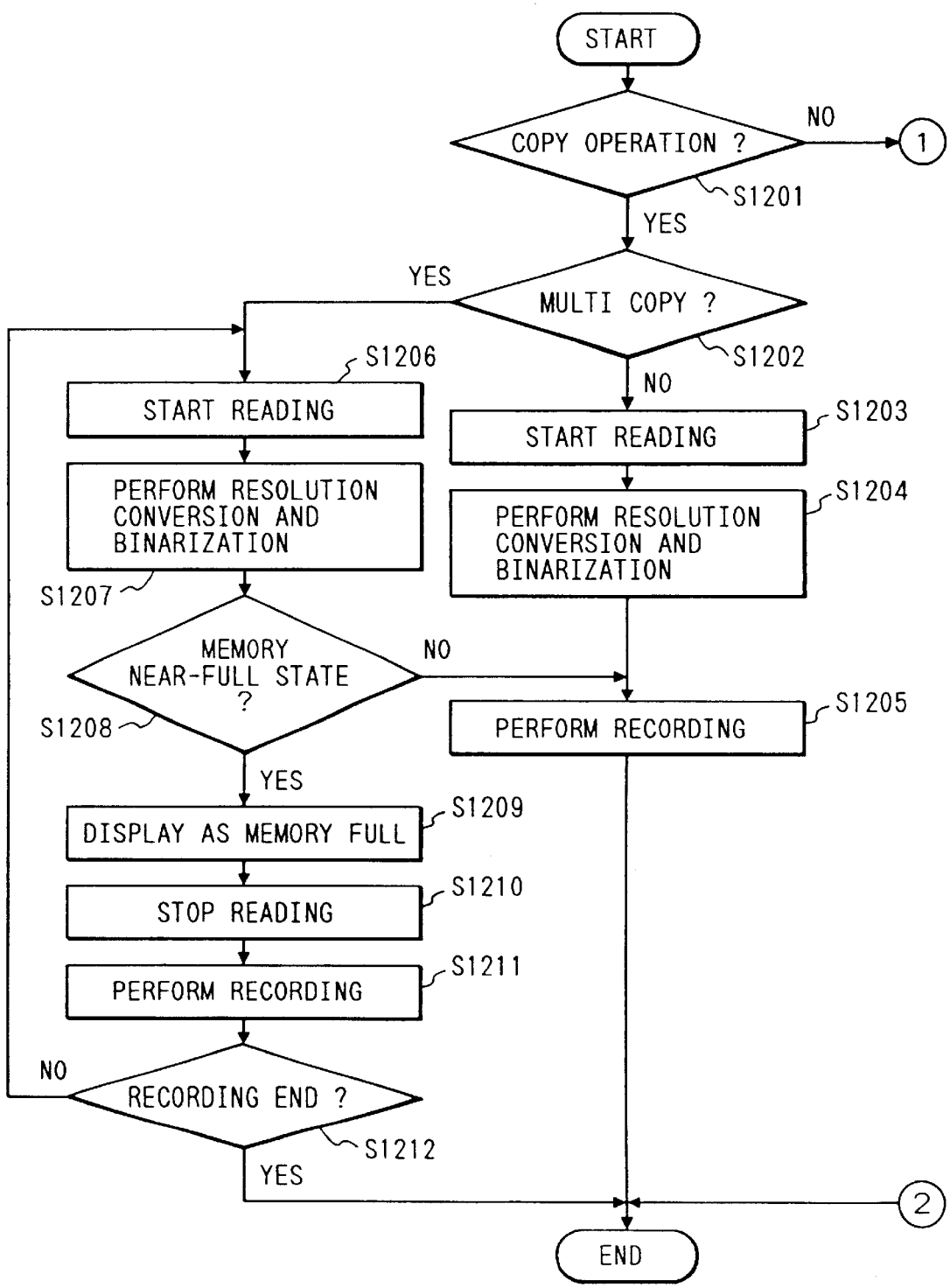
FIGS. 12 and 13 are flowcharts showing a flow for processes in the third embodiment.
Figure 13:
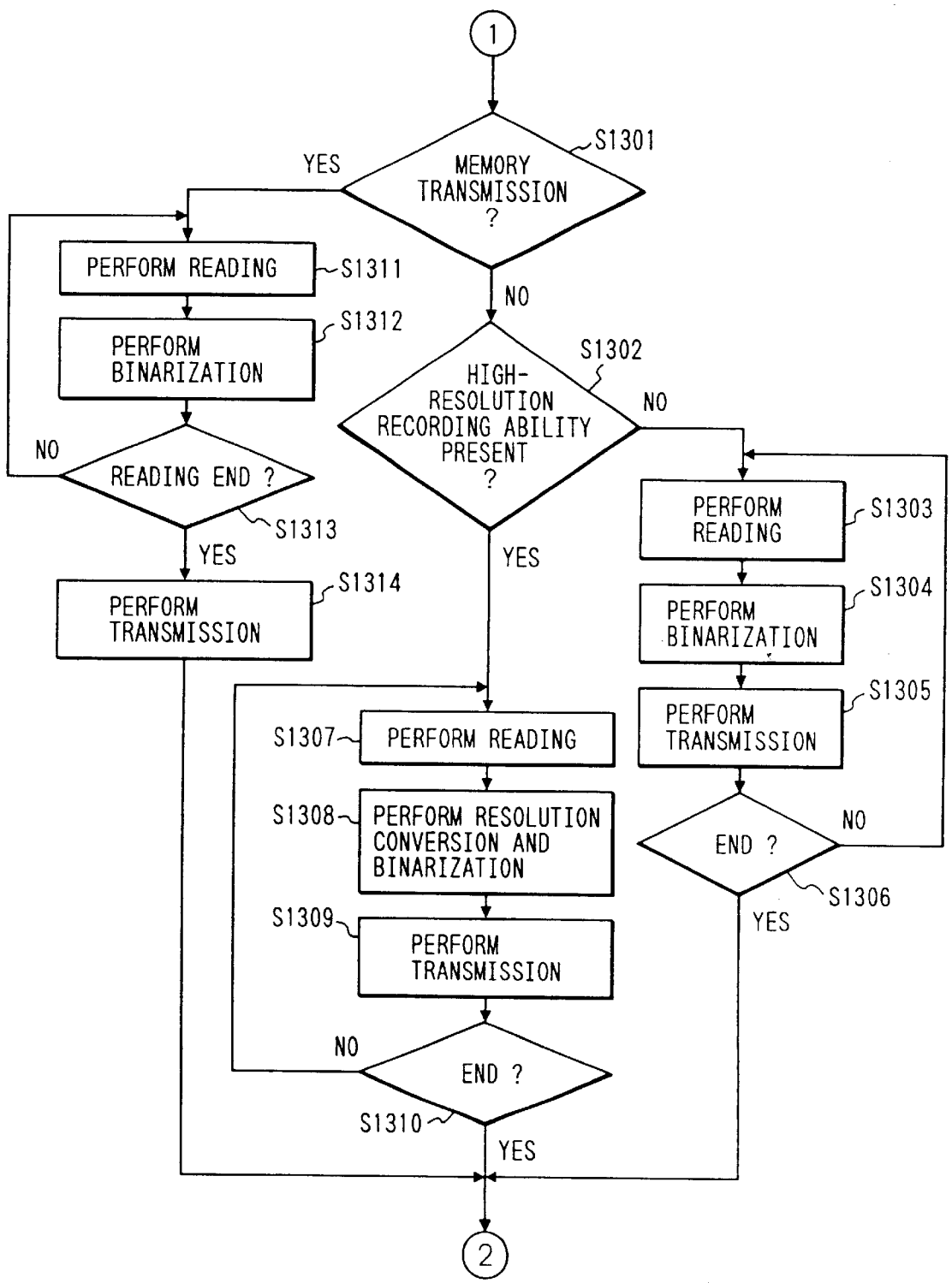

A flow of processes regarding the reading operation by the CCD 1109 such as copy or transmission will now be described with reference to a flowchart shown in FIG. 12. Those processes are executed on the basis of a command from the CPU 1101.

First in step S1201, a check is made to see if the instruction performed through the console unit 1104 is a copy instruction or not. If YES, a check is made in step S1202 to see if the instruction is a multicopy instruction to copy the same original to a plurality of recording papers or not. If NO, the instruction indicates the single copy mode. In this case, the processing routine advances to step S1203 and the reading operation by the CCD 1109 is started. It is assumed that the reading resolution has been set to, for example, (203.2 dpi×391.16 dpi). The read image data is subjected to pre-processes such as a shading correction and the like by the analog correction processing unit 1110 and step S1204 follows. In step S1204, the binarization is executed by the binarization processing unit 1111. In this case, since the output resolution has already been known, the binarization processing unit 1111 resolution converts the input image data in accordance with the recording resolution of the LBP 1113 and, after that, binarizes the converted image data and outputs. The binary image data of a high resolution is once stored in the RAM 1112 every line and is synchronized and is outputted to the LBP 1113. The image data is printed to the recording paper by the LBP 1113 in step S1205.

When the copy mode is the multicopy mode in step S1202, the reading operation by the CCD 1109 is-started in step S1206. The processes until the image data read at a predetermined resolution is binarized by the binarization processing unit 1111 in accordance with the recording resolution (S1207) are substantially the same as those in the single copy mode. Therefore, their descriptions are omitted here. In the multicopy mode, since the same image data is outputted a plurality of number of times, it is necessary to store the image data of one page into the apparatus. For this purpose, the binary image data is encoded by the encoder

1114 and the encoded data of one page is tried to be stored in the RAM 1103. Namely, when a memory overflow doesn't occur and the image data of one page is accumulated in step S1208, the LBP 1113 is activated and while decoding the stored encoded data by the decoder 1115, the decoded image data is transferred to the LBP 1113 through the RAM 1112 and the first page is printed in step S1205. As for the second and subsequent pages, the encoded data stored in the RAM 1103 is used and the images are printed and outputted in a manner similar to step S1205. After completion of the copy of a plurality of recording papers, the encoded data stored in the RAM 1103 is cleared.

In the case where the capacity of the memory to store the encoded data is small or in case of an image of a low encoding efficiency, after the resolution was converted to a high resolution, an information amount of the binarized image data is large. In dependence on an encoding efficiency, there is a case where the encoded data of one page cannot be stored in the RAM 1103. In such a case, namely, when the memory enters a near full state in step S1208, step S1209 follows and a message indicating that the multicopy cannot be performed due to a memory full state is displayed to the console unit 1104. In step S1210, before the RAM 1103 becomes full, the reading operation is once stopped. The recording operation is started in step S1211. Since a space occurs in the RAM 1103 by the recording operation, the reading operation is restarted in step S1206 and those processes are repeated until the copy of one recording paper is finished. The single copy by the synchronous copy is executed. The processing routine is finished.

When it is judged in step S1201 that the copy operation is not performed, this means that the transmitting operation is executed. Step S1301 follows and a check is made to see if the memory transmission mode to transmit the read image data after it was once stored in the memory has been instructed or not. When the mode is not the memory transmission mode, this means that the instruction of the direct transmission mode for transmitting the original image while reading it has been inputted from the console unit 1104. In this case, the apparatus is first connected to the communication partner side and the recording resolution of the partner side is checked by a protocol of the facsimile apparatus. In step S1302, a check is made to see if a recording resolution in the main scanning direction of the partner side is a high resolution such as 406.4 dpi or not. When it is not the high resolution but is equal to 203.2 dpi (8 dots/mm), the reading operation is started at the resolution (standard, fine, or super fine) selected by the operator in step S1303. Namely, the image data of the original read by the CCD 1101 is inputted to the binarization processing unit 1111 through the analog correction processing unit 1110. The resolution in the sub scanning direction such as standard, fine, super fine, or the like is adjusted on the basis of the number of driving steps per one line of the motor 1107. In step S1304, the image data is binarized by the binarization processing unit 1111 without performing the resolution converting process. The image data binarized by the binarization processing unit 1111 is once stored in the RAM 1112 and is sequentially encoded by the encoder 1114. The encoded data is stored in the RAM 1103. In step S1305, the encoded data stored in the RAM 1103 is modulated by the modem 1105 and is transmitted to the partner side through the NCU 1106 and line 1119. The above processes are repeated until the end of the transmission is judged in step S1306.

When it is judged in step S1302 that the recording resolution in the main scanning direction of the partner side is the high resolution, the reading operation is started in step S1307 (203.2 dpi in the main scanning direction, 391.16 dpi in the sub scanning direction). In step S1308, the resolution is converted to the high resolution by the binarization processing unit 1111 in accordance with the recording resolution of the partner side and, after that, the image data is binarized. In step S1309, the binarized image data is transmitted as mentioned above.

When it is judged that the mode is the memory transmission mode in step S1301, the reading operation of the original is started in step S1311. Since the reading operation in the photograph mode is now considered as a prerequisite, as a resolution in the sub scanning direction which can be selected by the operator, either one of 97.79 dpi (standard) and 195.58 dpi (fine) can be selected. The selection of 391.16 dpi (super fine) is inhibited. The image data read at the resolution selected by the operator is binarized by the binarization processing unit 1111 in step S1312 without performing the resolution conversion and is sequentially stored in the RAM 1112. After the image data was encoded by the encoder 1114, it is stored in the RAM 1103. The above processes are repeated until the reading operation of the whole original is finished in step S1313. When all of the encoded data is stored in the RAM 1103, it is transmitted to the partner side as mentioned above in step S1314.

The receiving operation will now be described. Since a construction of the receiving operation is similar to that of the conventional apparatus, it is not shown.

The encoded data received from the line 1119 through the NCU 1106 is demodulated by the modem 1105 and is once stored in the RAM 1103. In the case where the encoded data to be outputted exists in the RAM 1103, the CPU 1101 activates the LBP 1113, the encoded data is decoded by the decoder 1115, and the decoded image data is developed in the RAM 1112. After that, the image data is sent to the LBP 1113 and is printed and outputted.

When the resolution of the received image differs from the output resolution here, the pixel density conversion is executed by a process using a projecting method or an SPC method in the LBP 1113.

As mentioned above, in case of the copy mode of which the output resolution is previously known or the direct transmission mode in which the output resolution of the communication partner side has already been known, to make the most of the output resolution, the pixel density conversion is executed before the binarization by the binarization processing unit 1111, thereby outputting the image data binarized at a high resolution.

The binarization processing unit 1111 will now be described in detail.

FIG. 14 is a block diagram showing a detailed constructional example of the binarization processing unit 1111. The binarization processing unit 1111 of the embodiment is considered so that a converting function to the high density image can be added by adding a functional block of a small scale to a binarization processing unit of a facsimile apparatus which doesn't have such a converting function.

In FIG. 14, reference numeral 1401 denotes an edge emphasis unit; 1402 a luminance/density conversion unit; 1403 a main scan conversion unit; 1404 an error diffusion unit; 1405 a clock control unit including a selector and a mask processing unit; and 1406 an OR gate.

FIG. 15 is a block diagram showing a detailed constructional example of the edge emphasis unit 1401.

In the diagram, reference numeral 1501 denotes a line memory control unit to switch controls of line memories 1502 and 1503 each for storing the image data of one line in accordance with an activation trigger which is generated from the CPU 1101. Reference numeral 1504 denotes latches each for storing the image data on a pixel unit basis and 1505 indicates an edge emphasis calculation unit to execute an edge emphasis filter arithmetic operation.

The operation of the binarization processing unit 1111 will now be described in detail.

The image data read by the CCD 1109 is subjected to an analog correcting process and an A/D conversion and is inputted to the binarization processing unit 1111 as digital image data of, for example, 6 bits/pixel and 64 gradations. A resolution in the main scanning direction of the image data inputted is determined by the CCD and an optical system and is set to 203.2 dpi. The input image data is inputted synchronously with a line sync signal on a line unit basis and also synchronously with a trailing edge of a pixel clock MCLK/2 on a pixel unit basis. In consideration of a handling with the analog correction processing unit 1110 here, it is assumed that the image data is continuously inputted synchronously with MCLK/2.

The image data outputted from the analog correction processing unit 1110 is first inputted to the edge emphasis processing unit 1401. In response to process activation triggers A and B generated from the CPU 1101, the edge emphasis processing unit 1401 sequentially transfers and stores the image data into the line memories 1502 and 1503 on a line unit basis synchronously with the line sync signal. The reason why there are two kinds of activation triggers A and B is to extract the superimposed image data after the edge emphasis by combining a motor driving control and the triggers A and B in the sub scanning direction. By the above mechanism, the line superimposing process after the edge emphasizing process in the sub scanning direction is realized.

When the binarizing process is activated by the trigger A, the image data outputted from the analog correction processing unit 1110 is inputted to the latch E of the latch group 1504. At the same time, the image data is sequentially transferred to the line memory 1502 through the latch E.

The line memory 1502 sequentially updates the memory contents by the input image data. Before the memory contents are updated by the new image data, the line memory 1502 outputs the memory contents to the latch D. Similarly, the line memory 1503 sequentially updates the memory contents by the image data inputted from the line memory 1502 through the latch D and also outputs the memory contents to the latch C before they are updated. In this manner, the image data of three lines are simultaneously inputted to the latch group 1504 by the line buffer of two lines and the line memories 1502 and 1503.

The latch group 1504 shifts the image data inputted from the analog correction processing unit 1110, the image data inputted from the line memory 1502, and the image data inputted from the line memory 1503 synchronously with the pixel clock MCLK/2, thereby outputting the matrix data of (3×3) to the edge emphasis calculation unit 1505. Reference characters A to H and X added to the latches correspond to reference pixel positions and a target pixel position of an edge emphasis filter shown in FIG. 16A.

The edge emphasis calculation unit 1505 executes an edge emphasis arithmetic operation using the matrix data obtained from the latch group 1504 and outputs the result to the luminance/density conversion unit 1402. The edge emphasis calculation unit 1505 applies a predetermined weight to the calculation result that is obtained by the Laplacian as a two-dimensional differentiation calculation of second order and adds the result to the target pixel X, thereby executing the resolution compensation. FIG. 16B is a diagram showing an example of filter coefficients of the edge emphasis calculation unit 1505. A degree of weight is arbitrarily changed in accordance with a magnification of the pixel density conversion.

Figure 17:
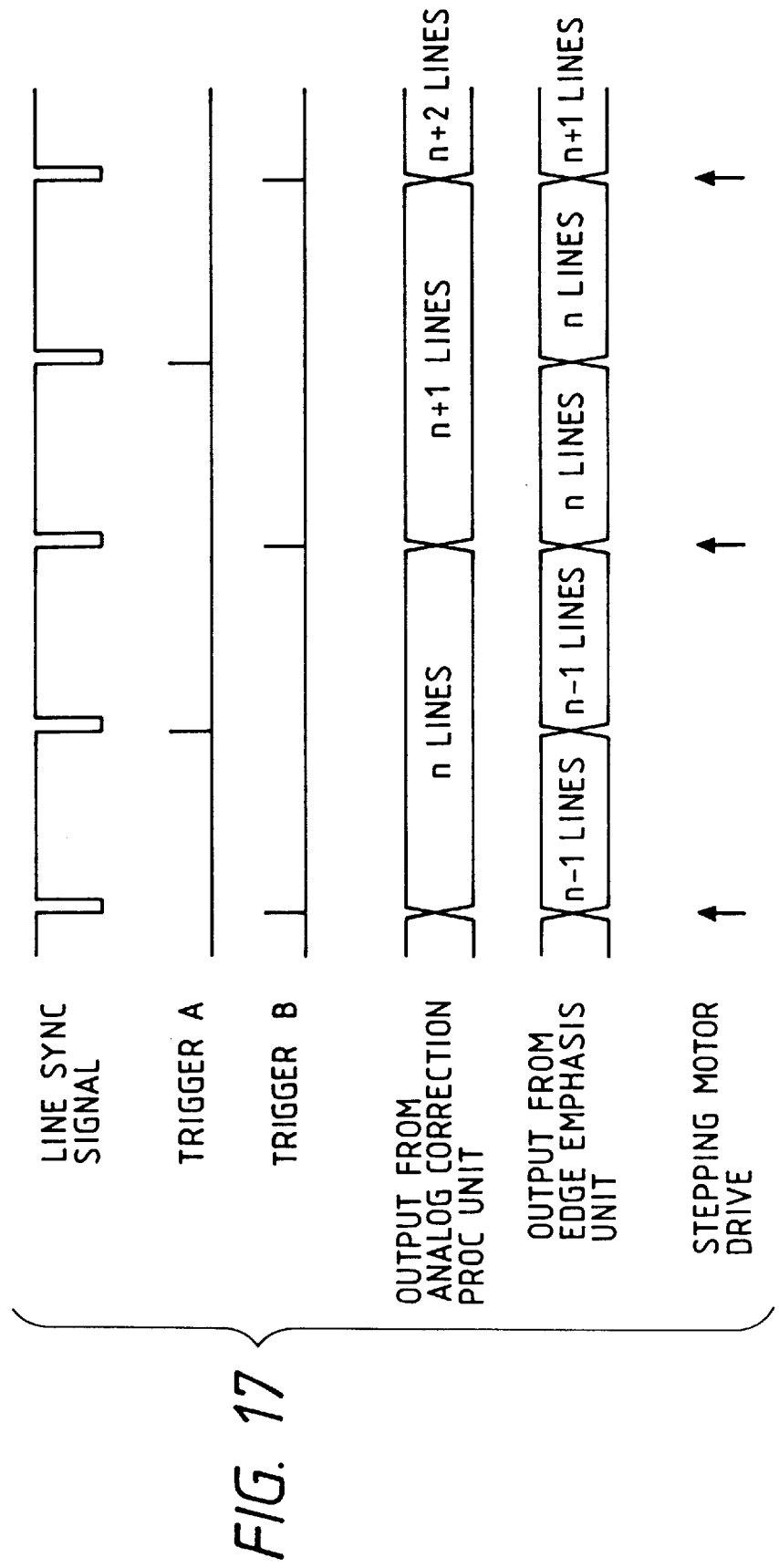
FIG. 17 is a diagram for explaining a converting process in the sub scanning direction in the third embodiment.

On the other hand, when the binarizing process is activated by the trigger B, different from the case of the trigger A, the memory contents of the line memories 1502 and 1503 are not updated but only the reading operation is executed for the line memories. Therefore, as shown in an example of FIG. 17, by alternately using the triggers B and A for the original feed of one step by the motor 1107, the same line data is read out twice from the line buffer. The superimposed data after the edge emphasis calculation can be taken out from the edge emphasis unit 1401.

Thus, the image data in which the pixel density in the sub scanning direction was enlarged two times after the edge emphasis can be outputted for one step of the motor 1107. In case of a high resolution of two times or more, it is sufficient to lead the trigger B a plurality of number of times in accordance with the magnification for one step of the motor 1107. When one step in the sub scanning direction is the same as the output resolution, by using only the trigger A, the image data in which the magnification is equal in the sub scanning direction can be obtained. In case of further reducing, it is sufficient that the ratio of the activation of the binarizing process by the trigger A is thinned out in accordance with the reduction ratio for the feed of the motor 1107.

The luminance/density conversion unit 1402 converts the image data which was resolution compensated by the edge emphasis unit 1401 from the luminance data to the density data by the conversion table. The conversion table is determined on the basis of the characteristics of the CCD 1109 and the recording characteristics of the image data which is binarized and recorded. Particularly, in case of the recording apparatus such as LBP, ink jet printer, or the like, since the recording characteristics of the binary image differ depending on the resolution, it is necessary to adjust so as to keep the recording density constant by changing the values of a luminance/density conversion table in accordance with the output resolution as mentioned above. Such a conversion table has previously been stored in an ROM built in the luminance/density conversion unit 1402. Or, for example, the table read out from the ROM 1102 by the CPU 1101 is set in an RAM built in the luminance/density conversion unit 1402.

Figure 18:
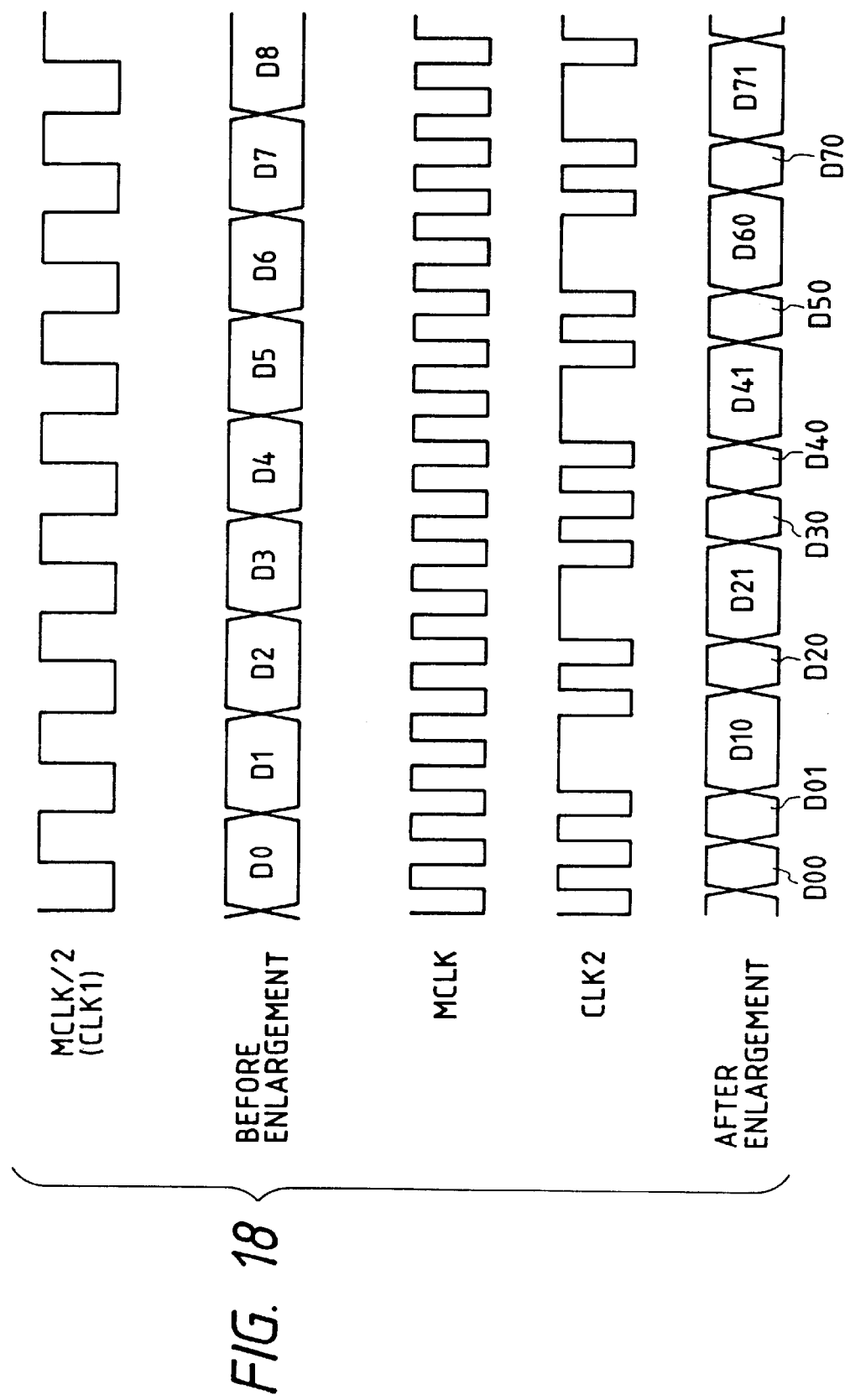
FIG. 18 is a diagram for explaining a converting process in the main scanning direction in the third embodiment.
Figure 20:
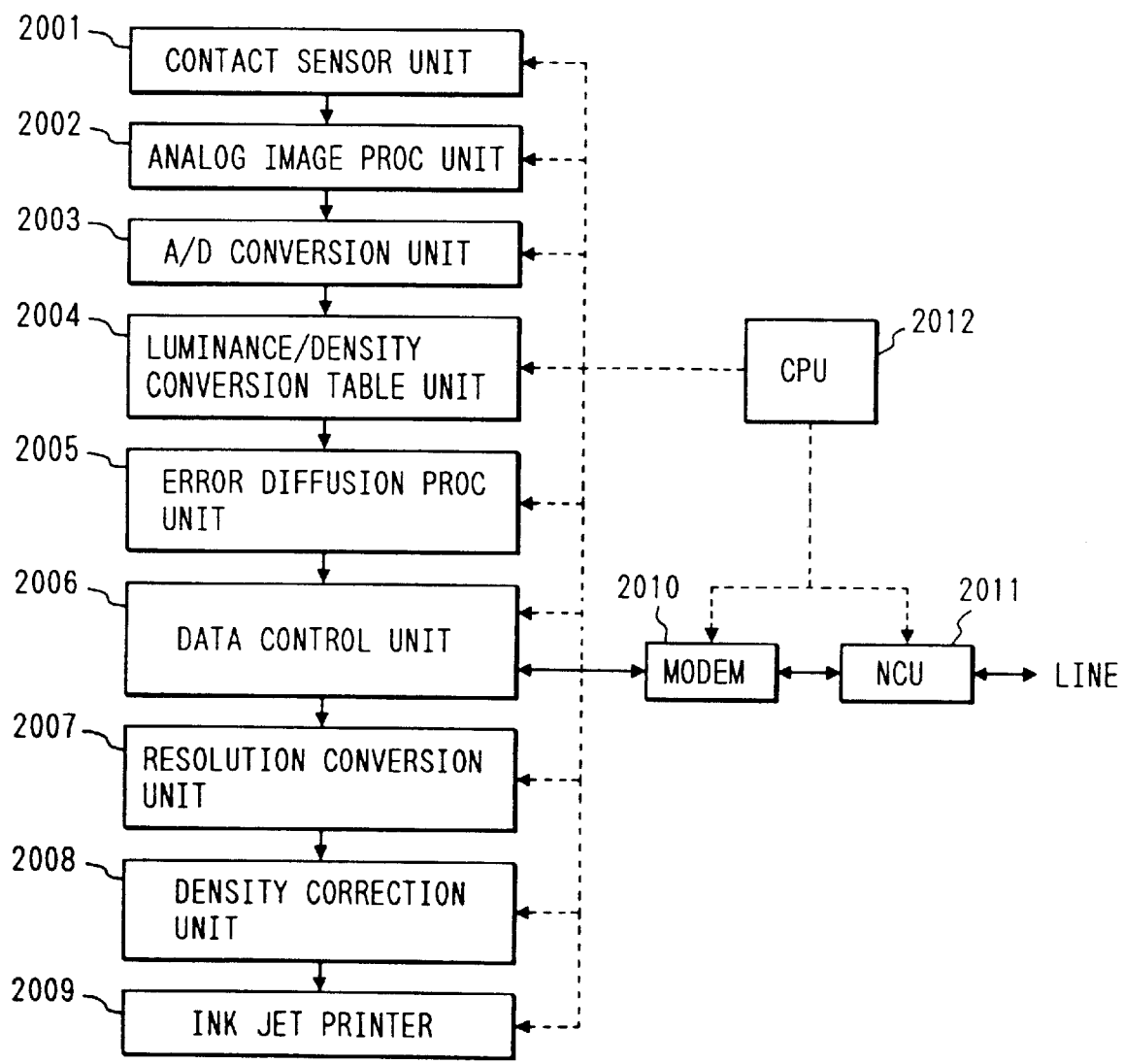
FIG. 20 is a block diagram showing a construction of a facsimile apparatus according to a conventional example.

The image data of 6 bits/pixel converted to the density data by the luminance/density conversion unit 1402 is converted in the main scan conversion unit 1403 at the magnification in which the pixel density in the main scanning direction was instructed by the CPU 1101 by the clock control of the clock control unit 1405. With reference to FIG. 18, explanation will now be made with respect to a variable magnifying process for reducing the image data of the resolution of 203.2 dpi in the main scanning direction to 5/7 time at a resolution of 406.4 dpi, namely, for enlarging the image data to 10/7 times.

The pixel density conversion in the main scanning direction in the embodiment is realized by the clock thinning-out process and is executed by a simple pixel superimposing process. The magnification control is performed by a control of an input pixel clock MCLK/2 and an output pixel clock CLK2.

When the variable magnifying process within a range from 100 to 200% is instructed by the CPU 1101, a selector 1405a in the clock control unit 1405 selects MCLK as a frequency that is twice as high as a frequency of MCLK/2 and supplies to a mask processing unit 1405*b*. When a magnification less than 100% is instructed, the same MCLK/2 as the input pixel rate of the binarization processing unit 1111 is supplied to the mask processing unit 1405*b*. The mask processing unit 1405*b* executes a mask operation according to the set magnification for an inputted clock, thereby forming CLK2. The clock CLK2 formed is supplied as a driving clock to the main scan conversion unit 1403 and error diffusion unit 1404.

As shown in FIG. 18, image data D0, D1, D2, . . . , which are transferred synchronously with the trailing edge of MCLK/2 are again sampled by the leading edge of CLK2 in the main scan conversion unit 1403, so that they are converted to image data D00, D0, D10, D20, . . . of the set magnification.

The image data of which the pixel density was converted in the main scanning direction is inputted to the error diffusion unit 1404 synchronously with CLK2 and is outputted as binary image data binarized to one bit/pixel. The detailed description of the error diffusing process is omitted.

As mentioned above, for the original feed of the motor 1107, by selectively using the superimposing and thinning-out process after the luminance/density conversion by the clock control in the main scanning direction and the two kinds of triggers which are given to the binarization processing unit 1111 in the sub scanning direction, the line superimposing process after the edge emphasis is executed and the variably magnified image data can be binarized and outputted by the error diffusing unit.

Although the above embodiment has been described with respect to the example using the edge emphasis filter coefficients shown in FIGS. 16B, by using coefficients shown in FIGS. 19A and 19B as such edge emphasis filter coefficients, a side effect of the edge emphasis can be suppressed. In this case, the target pixel becomes the pixel F shown in FIG. 16A and the pixels which are two lines before are referred. Therefore, the data reference for the edge emphasis calculation is not performed to the data of the same line. The side effect due to the edge emphasis after the superimposing process can be suppressed.

According to the embodiment as described above, in the case where the read image data is converted to the binary image by the error diffusing method to express the density by the number of black dots per unit area and is outputted, by executing the pixel density conversion before the image data is binarized to the binary image, an area of one dot of the density expression can be reduced. In a portion in which a density gradient is relatively gentle, there is an effect such that a texture that is peculiar to the half-tone process is made inconspicuous. Further, by reducing a notch of the edge portion of a character or diagram portion, a sharpness of the edge portion of the character or diagram is improved or the like, so that the picture quality can be improved.

By realizing the pixel density converting function by both of the simple clock control unit and the two different triggers for line buffer control for the edge emphasis, the binarization processing unit can be constructed without newly providing a line buffer to enlarge in the sub scanning direction. Further, the binarization processing unit to obtain a binary image of a high density can be constructed by merely adding a simple control circuit and an error buffer for a necessary enlarged image.

By executing the enlarging process after the edge emphasis, it is possible to obtain a good enlarged image in which the double lines of the image edge portion as shown in FIG. 8 (caused by the superimposition of the high frequency component) which are caused by superimposing the same data before the edge emphasis is prevented.

As a line buffer necessary for the edge emphasis, it is sufficient to use a line buffer of a size such that an image of a resolution of 203.2 dpi can be stored. An increase in memory capacity in association with the addition of a new function can be also minimized.

Further, as an image transfer clock of each calculation block in the enlarging process in the main scanning direction of the binarization processing unit, continuous clocks are used in the edge emphasis and the luminance/density converting process. The error diffusing process uses the clocks obtained by thinning out the clocks of the number that is integer times as large as the number of clocks used in the edge emphasis. Consequently, an arbitrary enlarging process can be realized by only the control of the image transfer clocks. Since the image transfer clocks for the edge emphasizing process are the continuous clock, a connecting performance between the CCD and the analog correction processing circuit is improved. As a line buffer for the edge emphasis unit, a line buffer of a capacity that is smaller than the number of reference lines by one line can be used.

Further, by changing the luminance/density conversion table in accordance with the pixel density to be converted in consideration of the density characteristics of the recording apparatus in which the recording characteristics of the binary image differ depending on the resolution, the recording density can be held constant. Such a point is as mentioned above.

In case of transmitting in the memory transmission mode, when the original is read in the photograph mode, the reading operation in the super fine mode (203.2 dpi×391.16 dpi) is inhibited. Therefore, the resolution conversion after the binarization can be omitted.

The invention can be applied to a system constructed by a plurality of equipment or to an apparatus constructed by one equipment.

The invention can be also applied to the case where it is accomplished by supplying a program to a system or an apparatus.

As described above, according to the invention, an image of a high quality which makes the most of the resolution of the recording apparatus can be recorded.

Although the present invention has been described above on the basis of the preferred embodiments, the invention is not limited to the foregoing embodiments but many modifications and variations are possible within the spirit and scope of the appended claims of the invention.

What is claimed is:

1. An image processing apparatus having a plurality of modes, comprising:

input means for inputting image data;

resolution converting means for converting a resolution of the image data into a predetermined resolution;

half-tone processing means for performing a half-tone process on the image data;

output means for outputting the image data;

transmission means for transmitting the image data via a line;

mode selecting means for selecting the mode; and control means for controlling in such a manner that, when a copy mode is selected by said mode selecting means, the image data inputted by said input means is converted by said resolution converting means, the converted image data is subjected to the half-tone process by said half-tone processing means, and the processed image data is outputted by said output means, wherein in a case where a direct transmission mode is selected by said mode selecting means and the resolution conversion is necessary, said control means controls in such a manner that the image data inputted by said input means is converted by said resolution converting means, the converted image data is subjected to the half-tone process by said half-tone processing means, and the processed image data is transmitted by said transmission means.

2. An apparatus according to claim 1, wherein a resolution of the image data that is outputted by said output means is higher than the resolution of the image data inputted by said input means.

3. An apparatus according to claim 1, wherein, in a case where the direct transmission mode is selected by said mode selecting means, said control means controls in such a manner that the inputting of the image data by said input means and the transmission of the image data by said transmission means are performed in parallel.

4. An apparatus according to claim 1, wherein the half-tone process performed by said half-tone processing means is performed in a case where a half-tone mode is selected by said mode selecting means.

5. An image processing apparatus having a plurality of modes, comprising:
   input means for inputting image data;
   resolution converting means for converting a resolution of the image data into a predetermined resolution;
   half-tone processing means for performing a half-tone process on the image data;
   output means for outputting the image data;
   transmission means for transmitting the image data via a line;
   mode selecting means for selecting the mode; and
   control means for controlling in such a manner that, when a copy mode is selected by said mode selecting means, the image data inputted by said input means is converted by said resolution converting means, the converted image data is subjected to the half-tone process by said half-tone processing means, and the processed image data is outputted by said output means,
   wherein, in a case where a memory transmission mode is selected by said mode selecting means, said control means controls in such a manner that the image data inputted by said input means is not converted by said resolution converting means but is subjected to the half-tone process by said half-tone processing means and the processed image data is transmitted by said transmission means.

6. An apparatus according to claim 5, wherein the resolution of the image data outputted by said output means is higher than the resolution of the image data inputted by said input means.

7. An apparatus according to claim 5, wherein, in the case where the memory transmission mode is selected by said mode selecting means, said control means controls such that the half-tone process is performed by said half-tone processing means on the image data inputted by said input means, and the half-tone processed image data is transmitted by said transmission means after storing it into a memory.

8. An apparatus according to claim 5, wherein the half-tone process performed by said half-tone processing means is performed in a case where a half-tone mode is selected by said mode selecting means.

9. An apparatus according to claim 5, further comprising a memory which is capable of storing binary image data for one pixel wherein said control means causes said memory to store the image data.

10. An image processing apparatus having a plurality of modes, comprising:
    input means for inputting image data;
    resolution converting means for converting a resolution of the image data into a predetermined resolution;
    half-tone processing means for performing a half-tone process on the image data;
    output means for outputting the image data;
    transmission means for transmitting the image data via a line;
    mode selecting means for selecting the mode: and
    control means for controlling in such a manner that, when a copy mode is selected by said mode selecting means, the image data inputted by said input means is converted by said resolution converting means, the converted image data is subjected to the half-tone process by said half-tone processing means, and the processed image data is outputted by said output means,
    wherein, in a case where a transmission mode is selected by said mode selecting means, said control means controls in such a manner that the image data inputted by said input means in a specified resolution is not converted by said resolution converting means but is subjected to the half-tone process by said half-tone processing means and the processed image data is transmitted by said transmission means.

11. An apparatus according to claim 10, wherein the resolution of the image data outputted by said output means is higher than the resolution of the image data inputted by said input means.

12. An apparatus according to claim 10, wherein, in the case where the transmission mode is selected by said mode selecting means and the resolution conversion is necessary, said control means causes said resolution converting means to convert the image data inputted by said input means, after causing said half-tone processing means to performed the half-tone process.

13. An apparatus according to claim 10, wherein said half-tone processing means performs the half-tone process in a case where a half-tone mode is selected by said mode selecting means.

14. An image processing apparatus having a plurality of modes, comprising:
    input means for inputting image data;
    input mode selecting means for selecting a mode in case of inputting the image data by said input means;
    transmission mode selecting means for selecting a transmission mode; and
    resolution selecting means for selecting a low resolution or a high resolution as a resolution in case of inputting the image data by said input means,
    wherein in a case where a half-tone mode is selected by said input mode selecting means and a memory transmission mode is selected by said transmission mode selecting means, the selection of the high resolution by said resolution selecting means is disabled.

15. An apparatus according to claim 14, wherein said low resolution includes a first resolution and a second resolution, and
    in the case where the half-tone mode by said input mode selecting means and the memory transmission mode is selected by said transmission mode selecting means, said resolution selecting means selects said first resolution or said second resolution.

16. A control method of an image processing apparatus having a plurality of modes, comprising:

(a) an input mode selecting step of selecting an input mode of image data;

(b) a transmission mode selecting step of selecting a transmission mode of the image data; and (c) a resolution selecting step of selecting a low resolution or a high resolution as a resolution of the image data that is inputted, wherein in a case where a half-tone mode is selected in step (a) and a memory transmission mode is selected in step (b), the selection of a high resolution in step (c) is disabled.

17. An image processing apparatus capable of operating in a first mode and a second mode, the apparatus comprising:

input means, having a first inputting function for inputting multi-value image data and a second inputting function for inputting binary image data;

output means for outputting the image data inputted using said first and second inputting functions;

a resolution converter, having a first converting function for converting a resolution of the multivalue image data and a second converting function for converting a resolution of the binary image data;

adjusting means for adjusting the image data in accordance with characteristics of said output means; and selecting means, said selecting means for selecting the first converting function when the apparatus operates in the first mode, or the second converting function when the apparatus operates in the second mode, wherein said output means outputs the image data which has been converted by the selected converting function and has been adjusted by said adjusting means.

18. An apparatus according to claim 17, wherein the first inputting function reads an image on a document to input the multi-value image data.

19. An apparatus according to claim 17, wherein the second inputting function receives the binary image data from a transmitter side via a line.

20. An apparatus according to claim 17, wherein said output means outputs a visible image on the basis of the binary image data.

21. An apparatus according to claim 17, wherein said adjusting means converts the multi-value image data inputted using the first inputting function into binary image data.

22. An apparatus according to claim 17, wherein said adjusting means performs a half-tone process on the multi-value image data inputted using the first inputting function to convert the multi-value image data into the binary image data.

23. An apparatus according to claim 17, wherein said adjusting means inverts the binary image data inputted using the second inputting function.

24. An apparatus according to claim 17, wherein the first mode is a copy mode, and wherein said selecting means selects the first converting function when the copy mode is being set.

25. An apparatus according to claim 17, wherein the second mode is a reception mode, and wherein said selecting means selects the second converting function when the reception mode is being set.

26. A computer readable program, stored in a storage medium, for controlling an image processing apparatus having a plurality of modes, said program comprising:

an input step of inputting image data;

a resolution converting step of converting a resolution of the image data into a predetermined resolution;

a half-tone processing step of performing a half-tone process on the image data;

an output step of outputting the image data;

a transmitting step of transmitting the image data via a line;

a mode selecting step of selecting a mode; and a control step of controlling in such a manner that, in a case a copy mode is selected in said selecting step, the image data inputted in said input step is converted in said resolution converting step, the converted image data is subjected to the half-tone process in said half-tone processing step, and the processed image data is outputted in said output step, and wherein, in a case where a direct transmission mode is selected in said mode selecting step and a resolution conversion is necessary, said control step controls in such a manner that the image data inputted in said input step is converted in said resolution converting step, the converted image data is subjected to the half-tone process in said half-tone processing step, and the processed image data is transmitted in said transmitting step.

27. A computer readable program, stored in a storage medium, for controlling an image processing apparatus having a plurality of modes, said program comprising:

an input step of inputting image data;

a resolution converting step of converting a resolution of the image data into a predetermined resolution;

a half-tone processing step of performing a half-tone process on the image data;

an output step of outputting the image data;

a transmitting step of transmitting the image data via a line;

a mode selecting step of selecting a mode; and a control step of controlling in such manner that, in a case where a copy mode is selected in said selecting step, the image data inputted in said input step is converted in said resolution converting step, the converted image data is subjected to the half-tone process in said half-tone processing step, and the processed image data is outputted in said output step, and wherein, in a case where a memory transmission mode is selected in said mode selecting step, said control step controls in such a manner that the image data inputted in said input step is not converted in said resolution converting step but is subjected to the half-tone process in said half-tone processing step and the processed image data is transmitted in said transmitting step.

28. A computer readable program, stored in a storage medium, for controlling an image processing apparatus having a plurality of modes, said program comprising:

an input step of inputting image data;

a resolution converting step of converting a resolution of the image data into a predetermined resolution;

a half-tone processing step of performing a half-tone process on the image data;

an output step of outputting the image data;

a transmitting step of transmitting the image data via a line;

a mode selecting step of selecting a mode; and a control step of controlling in such a manner that, in a case where a copy mode is selected in said selecting step, the image data inputted in said input step is converted in said resolution converting step, the converted image data is subjected to the half-tone process in said half-tone processing step, and the processed image data is outputted in said output step, and wherein, in a case where a transmission mode is selected in said mode selecting step, said control step controls in such a manner that the image data inputted in said input step is not converted in said resolution converting step but is subjected to the half-tone process in said half-tone processing step and the processed image data is transmitted in said transmitting step.

29. A computer readable program, stored in a storage medium, for controlling an image processing apparatus having a plurality of modes, said program comprising:

an input mode selecting step of selecting an input mode of image data;

a transmission mode selecting step of selecting a transmission mode of the image data; and a resolution selecting step of selecting a low resolution or a high resolution as a resolution of the image data that is inputted, wherein, in a case where a half-tone mode is selected in said input mode selecting step and a memory transmission mode is selected in said transmission mode selecting step, the selection of the higher resolution is disabled in said resolution selecting step.

30. A computer readable program stored in a storage medium, comprising:

a first input step of inputting multi-value image data;

a second input step of inputting binary image data;

an output step of outputting the image data inputted in said first or second input step;

a first converting step of converting a resolution of the multi-value image data;

a second converting step of converting a resolution of the binary image data;

an adjusting step of adjusting the image data in accordance with an output form in said output step; and a selecting step of selecting the conversion in said first converting, during a first operating mode, or the conversion in said second converting step, during a second operating mode, wherein said output step outputs the image data which has been converted in said first or second converting step, in accordance with the selection in said selecting step, and adjusted in said adjusting step.

31. An image processing method comprising:

an input step of inputting image data;

a resolution converting step of converting a resolution of the image data into a predetermined resolution;

a half-tone processing step of performing a half-tone process on the image data;

an output step of outputting the image data;

a transmitting step of transmitting the image data via a line;

a mode selecting step of selecting a mode; and a control step of controlling in such a manner that, in a case a copy mode is selected in said selecting step, the image data inputted in said input step is converted in said resolution converting step, the converted image data is subjected to the half-tone process in said half-tone processing step, and the processed image data is outputted in said output step, and wherein, in a case where a direct transmission mode is selected in said mode selecting step and a resolution conversion is necessary, said control step controls in such a manner that the image data inputted in said input step is converted in said resolution converting step, the converted image data is subjected to the half-tone process in said half-tone processing step, and the processed image data is transmitted in said transmitting step.

32. An image processing method comprising:

an input step of inputting image data;

a resolution converting step of converting a resolution of the image data into a predetermined resolution;

a half-tone processing step of performing a half-tone process on the image data;

an output step of outputting the image data;

a transmitting step of transmitting the image data via a line;

a mode selecting step of selecting a mode; and a control step of controlling in such a manner that, in a case where a copy mode is selected in said selecting step, the image data inputted in said input step is converted in said resolution converting step, the converted image data is subjected to the half-tone process in said half-tone processing step, and the processed image data is outputted in said output step, and wherein, in a case where a memory transmission mode is selected in said mode selecting step, said control step controls in such a manner that the image data inputted in said input step is not converted in said resolution converting step but is subjected to the half-tone process in said half-tone processing step and the processed image data is transmitted in said transmitting step.

33. An image processing method comprising:

an input step of inputting image data;

a resolution converting step of converting a resolution of the image data into a predetermined resolution;

a half-tone processing step of performing a half-tone process on the image data;

an output step of outputting the image data;

a transmitting step of transmitting the image data via a line;

a mode selecting step of selecting a mode; and a control step of controlling in such a manner that, in a case where a copy mode is selected in said selecting step, the image data inputted in said input step is converted in said resolution converting step, the converted image data is subjected to the half-tone process in said half-tone processing step, and the processed image data is outputted in said output step, and, wherein, in a case where a transmission mode is selected in said mode selecting step, said control step controls in such a manner that the image data inputted in said input step is not converted in said resolution converting step but is subjected to the half-tone process in said half-tone processing step and the processed image data is transmitted in said transmitting step.

34. An image processing method comprising:

an input mode selecting step of selecting an input mode of image data;

a transmission mode selecting step of selecting a transmission mode of the image data; and a resolution selecting step of selecting a low resolution or a high resolution as a resolution of the image data that is inputted, wherein, in a case where a half-tone mode is selected in said input mode selecting step and a memory transmission mode is selected in said transmission mode selecting step, the selection of the higher resolution is disabled in said resolution selecting step.

35. An image processing method comprising:

a first input step of inputting multi-value image data;

a second input step of inputting binary image data;

an output step of outputting the image data inputted in said first or second input step;

a first converting step of converting a resolution of the multi-value image data;

a second converting step of converting a resolution of the binary image data;

an adjusting step of adjusting the image data in accordance with an output form in said output step; and a selecting step of selecting the conversion in said first converting step, during a first operating mode, or the conversion in said second converting step, during a second operating mode, wherein said output step outputs the image data which has been converted in said first or second converting step, in accordance with the selection in said selecting step, and adjusted in said adjusting step.

36. A method for controlling an image processing apparatus for binarizing inputted multi-level image data and outputting the binarized image data, comprising:

determining whether or not the resolution of the inputted multi-level image date is different from an output resolution of the image processing apparatus;

converting the resolution of the inputted multi-level image data before binarizing, in a case where it is determined that the resolution is different; and binarizing and outputting the multi-level image data of which resolution has been converted.

37. A method according to claim 36, wherein the multi-level image data ia binarized by performing half-tone processing.

38. A method according to claim 37, wherein the multi-level image data is binarized by using an error diffusion method.

39. A method according to claim 36, wherein the binarized image data whose resolution is different from the input image data is output to a printer.

40. A method according to claim 36, further comprising a step of transmitting the binarized image data via a line, wherein the input image data is inputted with a resolution for transmission by a reader which reads images on a document for transmission.

41. A method according to claim 40, wherein, in a case where the input image data is transmitted, the resolution is not converted in said converting step.

42. A method according to claim 36, wherein edge emphasis processing is performed for the multi-level image data before converting the resolution.

* * * * *

UNITED STATES PATENT AND TRADEMARK OFFICE
CERTIFICATE OF CORRECTION

PATENT NO. : 6,289,137 B1
DATED : September 11, 2001
INVENTOR(S) : Norio Sugiyama et al.

Page 1 of 1

It is certified that error appears in the above-identified patent and that said Letters Patent is hereby corrected as shown below:

Column 1,
Line 19, "of" should read -- all of --.

Column 6,
Line 4, "pixel. Reference" should read -- pixel. ¶ Reference --.

Column 8,
Line 9, "(7.7 (lines/mm))/(360(dpi))=0.543" should read -- {7.7 (lines/mm)}/{360(dpi)} =0.543 --;
Line 43, "{15.4(lines/mm)){360(dpi)}=1.087" should read -- {15.4(lines/mm)}/{360 (dpi)}=1.087 --.

Column 11,
Line 11, "to-the" should read -- to the --;
Line 16, "-magnification" should read -- magnification --.

Column 15,
Line 15, "almost" should read -- almost all --.

Column 24,
Line 36, "performed" should read -- perform --.

Signed and Sealed this

Ninth Day of April, 2002

Attest:

*Attesting Officer*

JAMES E. ROGAN
*Director of the United States Patent and Trademark Office*